United States Patent [19]

Christensen et al.

[11] Patent Number: 5,572,884
[45] Date of Patent: Nov. 12, 1996

[54] HEAT PUMP

[75] Inventors: Richard N. Christensen, Columbus, Ohio; Srinivas Garimella, Kalamazoo, Mich.

[73] Assignee: The Ohio State University Research Foundation, Columbus, Ohio

[21] Appl. No.: 334,412

[22] Filed: Nov. 4, 1994

[51] Int. Cl.$^6$ .............................. F25B 15/00; F25B 15/12
[52] U.S. Cl. ................................. 62/476; 62/484; 62/485
[58] Field of Search ............................ 62/476, 101, 103, 62/484, 485, 495

[56] References Cited

U.S. PATENT DOCUMENTS

| | | | |
|---|---|---|---|
| 2,073,651 | 3/1937 | Randel | 62/484 |
| 2,196,911 | 4/1940 | Getaz | 62/118 |
| 2,894,380 | 7/1959 | Palmatier | 62/476 |
| 3,483,710 | 12/1969 | Bearint | 62/79 |
| 3,748,828 | 7/1973 | Lefebvre | 55/2 |
| 4,318,872 | 3/1982 | Romano | 261/140 A |
| 4,441,332 | 4/1984 | Wilkinson | 62/238.3 |
| 4,477,396 | 10/1984 | Wilkinson | 261/140 R |
| 4,542,628 | 9/1985 | Sarkisian et al. | 62/335 |
| 4,651,819 | 3/1987 | Yumikura et al. | 165/115 |
| 4,655,174 | 4/1987 | Fillios | 122/261 |
| 4,732,008 | 3/1988 | DeVault | 62/79 |
| 4,926,659 | 5/1990 | Christensen et al. | 62/476 |
| 5,157,942 | 10/1992 | Dao | 62/476 |
| 5,284,029 | 2/1994 | Keuper et al. | 62/476 |
| 5,339,654 | 8/1994 | Cook et al. | 62/476 |

FOREIGN PATENT DOCUMENTS 318865  12/1989  Japan ........................... 62/495

*Primary Examiner*—William Doerrler
*Attorney, Agent, or Firm*—Philip J. Pollick

[57] ABSTRACT

An absorption refrigeration machine with two, non-fluid linked loops uses heat from a first loop rectifier to heat a second loop generator by either direct or hydronic heat exchange. Flue gas from the heating of the first loop generator is used to heat strong solution in the second loop. Heat from the first loop condenser and absorber are also used to heat the second loop generator by either direct or hydronic fluid coupling. In order to improve further the efficiencies of the absorption machine, a mass and heat transfer device is used that provides a liquid and vapor distribution system that affords effective heat transfer in conjunction with a large and continually renewed liquid surface area and a relatively constant vapor velocity to effect efficient mass transfer among the various components and processes of the refrigeration machine. A simple liquid metering system is used to meter equal amounts of liquid into the divided liquid flow arrangements used in various components of the machine.

99 Claims, 7 Drawing Sheets

HEAT PUMP

FIELD OF INVENTION

This invention relates generally to absorption refrigeration machines and more particularly to multiple-loop, absorption refrigeration machines utilizing rejected rectifier heat.

BACKGROUND

The single absorption refrigeration cycle or loop is well known and has been used for many years. In its basic form, it consists of an interconnected absorber, desorber (generator), condenser, and evaporator that use a refrigerant and an absorbent as a refrigerant pair and a heat source to transfer heat between a heat load and a heat sink.

The absorber contacts low pressure refrigerant vapor with a miscible absorbent. Absorption takes place as a result of the mixing tendency of the miscible materials as well as an affinity between the refrigerant vapor and the absorbent and results in the generation of thermal energy which is released to the heat sink. The mixture formed by the absorption process, which is referred to here as the strong solution, is pressurized by means of a solution pump and conveyed via a heat exchanger to the desorber (generator).

The generator (desorber) causes the refrigerant vapor and absorbent to separate as a result of the application of heat. When the absorbent is a nonvolatile material, heating of the strong solution is sufficient to accomplish complete separation of the refrigerant vapor. The remaining absorbent, referred to as a weak solution, is returned to the absorber to again begin the absorption process.

When the absorbent is a volatile material such as water in an ammonia/water refrigerant pair, a rectifier is required to move the last traces of the volatile absorbent (water) from the refrigerant vapor (ammonia). As used here, the term "rectifier" includes all types of fractional distillation equipment used to remove a volatile absorbent from the refrigerant vapor. Rectification results in heat generation as the volatile absorbent condenses to a liquid. The heat from the rectification process is also released to a heat sink. Removal of the absorbent from the refrigerant vapor is essential in that contamination of the refrigerant vapor with absorbent interferes with refrigerant vaporization in the latter refrigerant vaporization step.

After rectification, the vapor passes to the condenser. The condenser condenses the refrigerant vapor to a liquid with the liberation of heat. The hot liquid refrigerant then passes to the evaporator.

The evaporator revaporizes the hot refrigerant liquid at low pressure and temperature with input of heat from the heat load, i.e., from the refrigerator, room, building, or other medium the system was designed to cool. From the evaporator, the refrigerant vapor enters the absorber to again cycle through the process. FIG. 1 illustrates a typical single cycle absorption system. The temperature of the components increases from left to right while pressure increases from bottom to top.

In evaluating the effectiveness of a particular absorption system, a common measure often used is the "coefficient of performance," i.e COP. The coefficient of performance (COP) is defined as the energy transferred at the load in a unit of time divided by the energy provided to the system in the same unit of time. The thermal efficiency (COP) of a single-effect cycle is typically about 0.5 to 0.7.

To improve thermal efficiency, a system having two separate absorption cycles without fluid connection, one operating at higher temperature and pressure and the other operating at lower temperature and pressure, is used. Various heat exchange arrangements of the components of this two or dual cycle system have been used to improve the operating efficiency of the system as is set forth below.

U.S. Pat. No. 2,196,911 discloses the use of two separate ammonia/water cycles in which the high-temperature generator (desorber) was used to directly heat the low-temperature generator; the lower temperature absorber was cooled by directly rejecting its heat to the high-temperature evaporator. U.S. Pat. No. 3,483,710, using a lithium bromide/water solution pair in each cycle, also discloses cooling the lower temperature absorber by rejecting its heat directly to the higher temperature evaporator and, in addition, using the high-temperature condenser to heat directly the low-temperature desorber (generator). However, it does not disclose the use of the high-temperature generator to heat the low-temperature generator.

U.S. Pat. No. 4,441,332 teaches a separate, dual loop system in which a lithium bromide/water refrigerant pair is used for the upper temperature loop and an ammonia/water refrigerant pair is used for the lower temperature loop. The patent teaches that a salt-based refrigerant pair is to be avoided in the lower temperature cycle in order to avoid freezing and crystallization problems. The condenser from the high-temperature loop is in heat exchange relation with the lower temperature desorber. The patent further provides for selectively arranging heat exchange relations between the higher temperature absorber, the higher temperature evaporator, the lower temperature condenser, the lower temperature evaporator, and the lower temperature absorber. U.S. Pat. No. 4,667,485 further improves on this concept by placing the higher temperature desorber, the higher temperature condenser, and the lower temperature desorber in sequential heat exchange relation from a central heat source.

U.S. Pat. No. 4,542,628 discloses the use of the rejected heat from the high-temperature condenser and absorber to heat the low-temperature desorber (generator). The high-temperature condenser heats the desorber directly while the high-temperature absorber heats the desorber indirectly by means of a closed-loop heat exchanger. The high-temperature evaporator is used to cool the low-temperature absorber and condenser.

U.S. Pat. No. 4,732,008 shows a dual cycle system in which the high-temperature condenser supplies heat directly to the low-temperature generator; the high-temperature absorber is used to heat the low-temperature generator by means of a closed-loop heat exchange system. Both the high and low-temperature evaporators provide cooling to the load. U.S. Pat. No. 5,284,029 improves on this arrangement by providing for direct coupling of the high-temperature absorber to the low-temperature generator.

Accordingly, it is an object of the present invention to provide a multiple cycle absorption refrigeration apparatus that is more efficient than prior devices.

Another object of this invention is to utilize the heat rejected by the rectifier in the high-temperature loop of a dual cycle system.

Another object of this invention is to provide a highly efficient system, i.e., a high COP, for a light commercial refrigeration system, e.g., approximately ten refrigeration tons.

A further object of this invention is to reduce the number of components thereby reducing overall system cost.

Another object of this invention is to reduce the operating pressure of the high-temperature loop with respect to double effect systems.

An additional object of the invention is to utilize as much heat as possible from the high-temperature loop in the low-temperature generator.

Another object of this invention is to more effectively use the heat values in the flue gases given off after the initial heating of the high-temperature desorber.

Another object of this invention is to provide system components that are simple and easy to manufacture.

Another object of this invention is to provide machine components that are more efficient in performing absorption machine processing.

Another object of this invention is to provide a simple and effective device for metering equal amounts of liquid into multiple conduits.

Another object of this invention is to provide a uniform refrigerant vapor velocity that affords improved liquid-vapor equilibrium conditions in absorption, desorption and other mass transfer processes.

Another object of this invention is to provide absorption machine components that are more efficient in thermal energy transfer.

Yet other objects of invention will become apparent to those of ordinary skill in the art from consideration of the present disclosure.

SUMMARY OF THE INVENTION

To achieve these objectives, an absorption refrigeration machine is featured that comprises two, non-fluid-linked loops or cycles. The first loop comprises a first generator, a first rectifier, a first condenser, a first evaporator, and a first absorber operatively connected together. The second loop comprises a second generator, a second condenser, a second evaporator and a second absorber also operatively connected together. Heat from the first rectifier is used to heat the second generator, that is, the first rectifier and the second generator are in heat exchange relation with each other. Heat exchange between the first rectifier and the second generator may be accomplished by either direct or hydronic coupling.

The first cycle uses a refrigerant pair with a volatile absorbent such as ammonia/water or ammonia water/lithium bromide. The second loop uses a refrigerant pair that may have either a volatile or non-volatile absorbent. A non-volatile absorbent is preferred in that the need for a rectifier in the second loop is eliminated. Illustrative refrigerant pairs with a volatile absorbent include ammonia/water, chlorofluoromethane (R-22)/E-181 and R123a/ETFE while refrigerant pairs without a volatile absorbent include ammonia/ sodium thiocyanate, lithium bromide/water, methanol/ lithium bromide and zinc bromide, water/lithium bromide and zinc bromide. Ammonia/sodium thiocyanate has been found to provide a dual cycle system with an especially attractive COP. A ternary mixture of ammonia/sodium thiocyanate and lithium thiocyanate has been found to extend the limits of crystallization and further improve cycle performance.

Another aspect of this invention is the use of flue gas from the heating of the first generator to effect the desorption process in the second generator. To further improve operating efficiencies, heat from the first condenser and absorber are also used to heat the second desorber. Such heating is accomplished by heat exchange with a hydronic fluid or preferably by direct heat exchange between the first condenser and absorber and the second desorber.

The invention also features a mass and heat transfer device that provides effective heat transfer in conjunction with a liquid distribution system that affords improved mass transfer by using a large and continually renewed liquid surface area. The device consists of a generally vertical tube with inner and outer walls and an upper and lower end. A longitudinal member is placed within the vertical tube to provide a continuous indirect vapor passage between the upper and lower ends of the tube. The longitudinal member is constructed so that the outermost radial portion of the member approaches or contacts the inner wall of the vertical tube through all radial orientations about the inner wall of the vertical tube with such contact or approach preferably being in a helical fashion about the inner tube wall.

In one of its simpler forms, the longitudinal member is a ribbon that is twisted about its longitudinal axis with the longitudinal axis of the ribbon being coextensive with the longitudinal axis of the vertical tube. The longitudinal member extends radially outward so as to contact or at least approach the inner wall of the vertical tube in order to accomplish its liquid distribution function. Contact is preferred to afford better heat exchange with the vertical tube. In order to provide greater liquid surface area for mass transfer operations, it is preferable that the longitudinal member comprise a helical fin projecting outward from a shaft that is placed at the center of and concentric with the vertical tube, that is, the axis of the shaft and the axis of the vertical tube are coextensive. In effect, the longitudinal member is preferably an auger-type device placed at the center of the vertical tube with the vapor passage being formed in the space between the turns of the auger fin, the outer wall of the shaft and the inner wall of the vertical tube.

To further improve liquid distribution and surface renewal, a groove is formed in the inner wall of the vertical tube. Preferably the groove has a radial orientation about the inner wall of the vertical tube, that is, about the circumference of the vertical tube but not necessarily in a perpendicular plane to the longitudinal axis of the vertical tube. Thus preferably the groove is a helical groove and preferably the groove has a downward emptying bias, that is, the groove slants downward so as to effectively spill liquid along its entire length. Preferably the groove is a helical flute with such an emptying bias.

By using such an assembly, excess liquid passing down the inner wall of the vertical tube passes to the portion of the longitudinal member nearest to the tube to form a thin film on the longitudinal member. Similarly excess liquid on the longitudinal member passes to the inner wall of the vertical tube. Because the radial orientation of the longitudinal member varies with respect to the inner wall of the vertical tube along its longitudinal axis, any excess accumulating liquid tends to be distributed uniformly on the walls of the vertical tube and on the longitudinal member. To further facilitate liquid distribution, the groove in the inner wall of the vertical tube accumulates liquid and distributes it on the inner wall of the tube and on the longitudinal member. By providing a downward emptying bias to the groove, there is a tendency for the liquid to spill out of the groove and constantly refresh the liquid surface on the inner wall of the vertical tube and on the longitudinal member.

To maintain constant vapor velocity and improve liquid-vapor equilibrium between vapor in the vertical tube and liquid that is distributed on the auger fin and inner wall of the vertical tube, it has been found advantageous to vary the pitch of the shaft fin, that is, the distance between adjacent turns of the fin. Thus fin pitch is increased in an upward direction when vapor is desorbed from the liquid and moves in an upward direction while pitch is decreased in an upward direction when vapor moves upward in an absorption process.

When a shaft and outward extending helical fin (auger-type member) are used for the longitudinal member, it is advantageous to use an open tube for the shaft to afford heat exchange with the helical fin and a heat exchange fluid flowing through the inside of the open tube used for the shaft. By contacting the outer most radial portion of the longitudinal member with the inner wall of the vertical tube, heat transfer between the vertical tube and longitudinal member can also be further enhanced.

To improve heat transfer from the inside to the outside of the vertical tube, the groove in the inner wall of the vertical tube is preferably a inner wall flute that extends and projects outward from the outer wall of the vertical tube as a tube wall crest. This facilitates heat exchange with a fluid external to the vertical tube. External heat exchange can be further enhanced by the use of an outward extending fin extending outward from the outer surface of the vertical tube. This is especially advantageous when the fin is a helical fin interposed between the outward extending helical flute. Preferably a commercially-available twisted fluted tube having many of the above features is used as the vertical tube. However, it is to be realized that the basic configuration of this invention can be achieved with tubes other than twisted fluted tubes.

Another feature of the invention is the enclosure, at least in part, of the outer wall of the vertical tube in a confining chamber. Although the chamber may be closed for insulation purposes, preferably it has an inlet and an outlet and is further configured to enhance heat exchange with the vertical tube. Further, this chamber can be adapted so that various cycle processes can take place within the confining chamber.

Thus, the confining chamber may be filled with Rashig rings to promote a rectification process with heat being transferred to the vertical tube. A similar configuration without packing material may be used in which a hydronic fluid circulates through the confining chamber to either cool or heat the vertical tube. Hot gases, such as flue gas, may be circulated through the confining chamber to heat the vertical tube.

The confining chamber can be modified further to carry more efficiently processes such as rectification, evaporation, condensation, etc. affording direct heat exchange with a cycle process taking place within the vertical tube. Thus, the confining chamber can comprise a concentric cylinder about the vertical tube. The outward projecting helical tube wall crest of the vertical tube may be brought near to or in contact with the concentric cylinder to define a helical passage about the exterior of the vertical tube. It is found to be advantageous to vary the pitch of the tube wall crest and the number of crest starts among and within a cycle process in order to achieve a relatively constant velocity for absorbing, desorbing, condensing, evaporating, etc. mass transfer gases to provide favorable vapor-liquid equilibrium conditions throughout the entire vapor passage.

Finally it is noted that often it is preferable to use multiple conduits in many of the devices of this invention. In order to use effectively a multiple number of conduits, it often is necessary to meter the same amount of liquid into each of the tubes. To accomplish this in an inexpensive and effective manner, it has been found advantageous to extend a multiple number of conduits through the bottom of a liquid container and cut equally-sized inverted triangular passages into each of the conduits with the bottom triangle apices at the same level, at or slightly above the bottom of the container. The triangular passage may be either open or closed, that is, the triangular passage may be closed on all three sides or it may be open at the top in the form of a "V".

The foregoing and other advantages of the invention will become apparent from the following disclosure in which one or more preferred embodiments of the invention are described in detail and illustrated in the accompanying drawings. It is contemplated that variations in procedures, structural features, flow directions and arrangement of parts may appear to a person skilled in the art without departing from the scope of or sacrificing any of the advantages of the invention.

BRIEF DESCRIPTION OF THE DRAWINGS

For a full understanding of the invention, reference should be made to the following detailed description of the drawings wherein.

Figure 1:
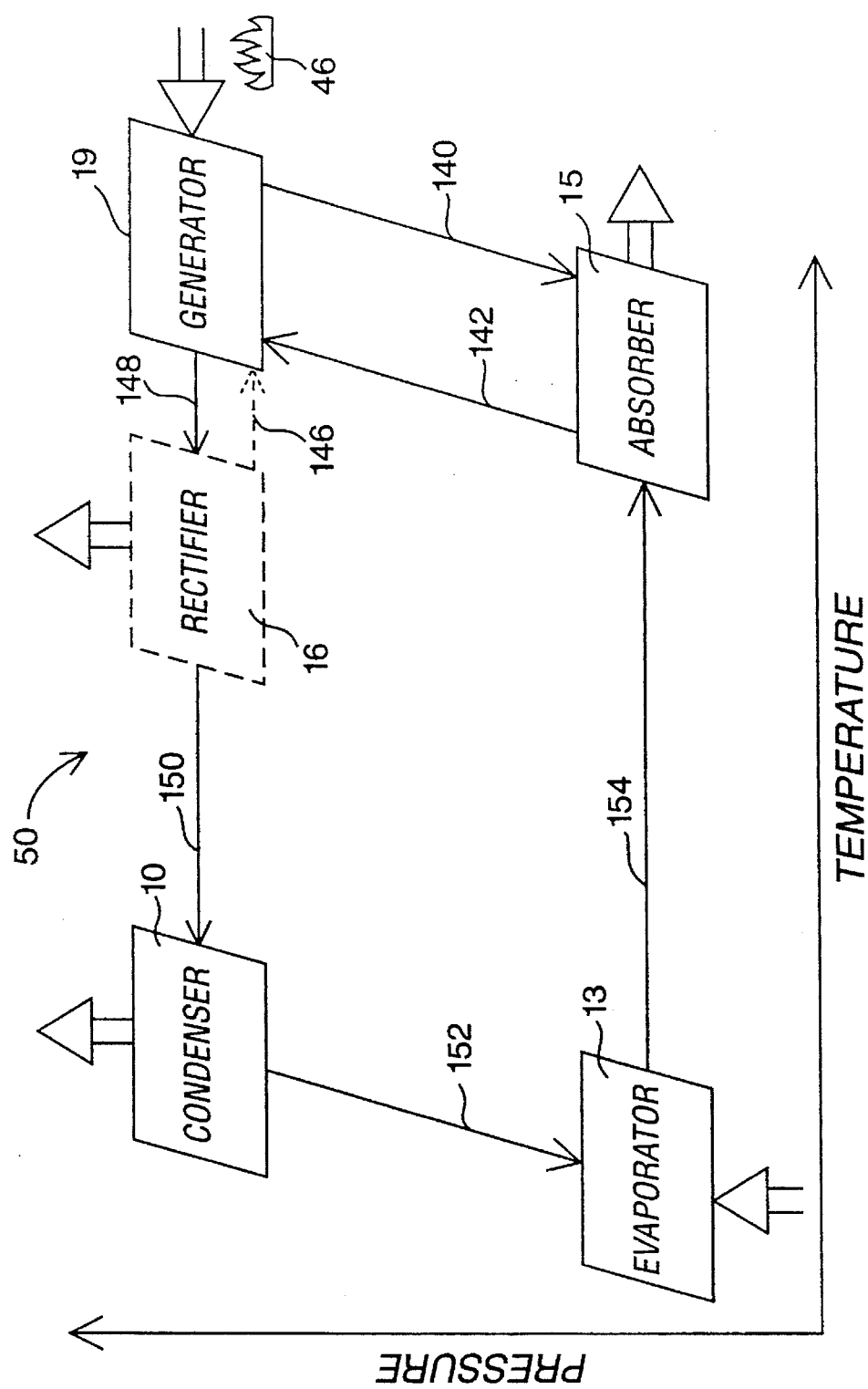
FIG. 1 is a schematic of a basic, single-cycle, absorption machine.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Because of the complexity of this system, identical reference numerals are used for similar components shown in the various drawings. This however is not meant to imply that the limitations of one embodiment are equally applicable to another embodiment nor is it intended that a particular component be limited to the features shown in any one drawing. Moreover, because various aspects of the invention come from differing arts with different terminologies, the followings terms are defined as follows in order to avoid possible confusion.

The terms "cycle" and "loop" are synonymous and refer to a closed system without fluid connection to another cycle or loop. A "working fluid" or "hydronic fluid" refers to a fluid that is used to transfer heat to or from a cycle or loop without fluid connection to the cycle or loop.

The term "strong solution," when referring to the solution pair, refers to solution that has picked up refrigerant in the absorber and is in progress toward the generator and carries a higher ratio of refrigerant to absorbent than solution which has been desorbed and partially expelled of refrigerant in the generator. Solution from which refrigerant has been expelled is, by contrast, a "weak solution" in that it holds a lesser ratio of refrigerant to absorbent.

The terms "generator" and "desorber" are synonymous. The term "heat exchanger" defines apparatus where fluids including gases are passed in close proximity to each other separated only by a usually impervious wall through which the heat from the warmer is conducted to the cooler. By convention, it is understood that heat passes from the hot fluid to the cold fluid.

FIG. 1. shows a thermodynamic representation of a conventional single circuit absorption machine utilizing a refrigerant having a volatile absorbent and therefore requiring rectification of the vapor released from the desorption process. This schematic representation is shown within a coordinate system having increasing temperature from left to right and increasing pressure from bottom to top.

Hot, weak absorbent solution (devoid of refrigerant) from generator 19, at a pressure equal to that in condenser 10, flows to absorber 15. Typically this solution is cooled by heat exchange to incoming generator solution in conduit 142 and throttled to the lower absorber pressure (not shown). Cold, weak solution absorbs low-pressure refrigerant vapor in absorber 15 with the release of heat as denoted by the large out-pointing arrow. Cold, strong solution is returned to generator 19 by means of a pump (not shown) via conduit 142. Prior to entering generator 19, it is warmed by heat exchange with the hot, weak solution leaving generator 19 through conduit 140. Warm, strong solution enters generator 19 via conduit 142 where heat is added as shown by the large in-pointing arrow with flame 46 immediately below it. Heating may be accomplished by direct combustion such as that of natural gas with air or by other means such as steam or electrical heating. Providing heat to generator 19 distills refrigerant from the strong solution leaving weak solution which is returned to absorber 15 via conduit 140.

The hot, high pressure refrigerant passes to condenser 10 via conduits 148 and 150. If the absorbent (weak solution) is a volatile material, it must be removed from the hot, high pressure refrigerant vapor by means of one or more fractional distillation (rectification) steps which are carried out in rectifier 16 where the less volatile absorbent is condensed and returned to generator 19 via conduit 146. Since rectification involves the condensation of the less volatile absorbent, the process involves the rejection of heat which is illustrated by the large upward pointing arrow from rectifier 16. Rectification is generally not required when the absorbent is a non-volatile salt such as lithium bromide. In such instances, rectifier 16 is unnecessary and the refrigerant vapor passes directly to condenser 10. If rectification is necessary, the purified refrigerant vapor passes to condenser 10 from rectifier 16 via conduit 150.

The hot refrigerant vapor condenses to a hot liquid in condenser 10 with the liberation of heat as denoted by the upward pointing arrow from condenser 10. The hot liquid refrigerant is then sent to low-pressure evaporator 13. Typically the hot, high pressure liquid refrigerant is throttled to the low pressure of evaporator 13 where it expands and evaporates using heat from the space to be cooled (load) as indicated by the large upward pointing arrow to condenser 13. The cold, low pressure refrigerant vapor is sent to absorber 15 via conduit 154 where it is absorbed by the weak solution in absorber 15.

Figure 2:
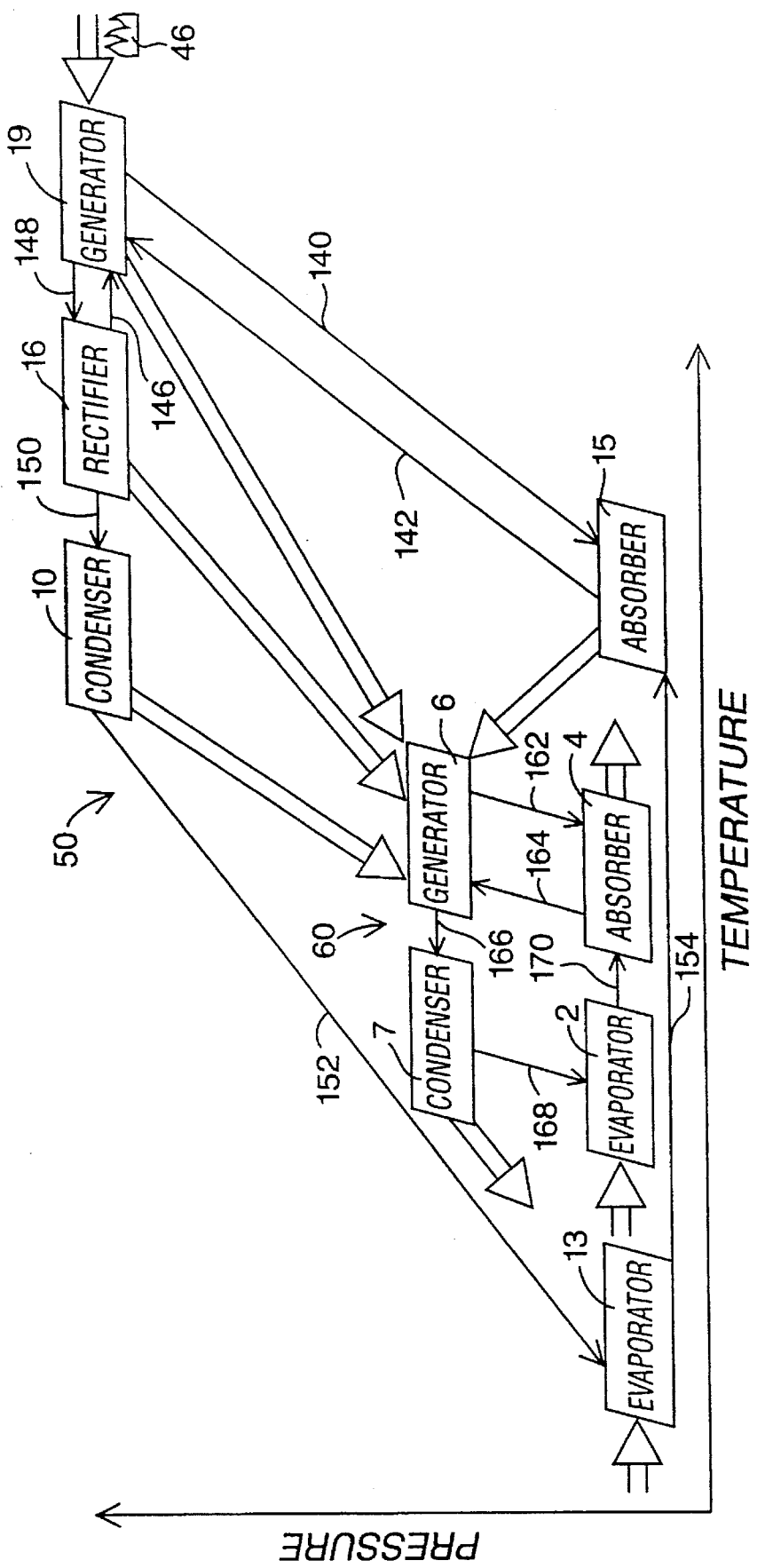
FIG. 2 is a schematic diagram of a dual cycle absorption machine of this invention illustrating the thermodynamic relation among the various components including the use of rejected rectifier heat values.

FIG. 2 is a thermodynamic representation of the invention. The absorption machine of this invention consists of two separate, non-fluid communicating loops, first loop 50 and second loop 60. The first loop 50 comprises first generator (desorber) 19, first rectifier 16, first condenser 10, first evaporator 13, and first absorber 15 operatively connected together as noted above for the description of FIG. 1 with the components and connecting conduits bearing the same numerals.

The second loop 60 comprises second generator (desorber) 6, second condenser 7, second evaporator 2, and second absorber 4, also operatively connected together in the following fashion. Weak solution is passed from generator 6 to absorber 4 via conduit 162 and returns as strong solution via conduit 164. Refrigerant vapor leaving the generator passes to condenser 7 through conduit 166. Hot liquid refrigerant is passed to evaporator 2 through conduit 168; cool refrigerant vapor leaves evaporator 2 and passes to absorber 4 through conduit 170. Throttling valves, heat exchangers, and pumps are used with the various flows as noted above in the general cycle description for FIG. 1.

The two loops are combined in a different manner than prior dual loop systems in that the heat rejected from first rectifier 16 of first loop 50 is used to heat second generator 6 of second loop 60 by placing first rectifier 16 and second generator 6 in heat exchange relation. This is accomplished by placing first rectifier 16 and second generator 6 in direct heat exchange relation with each other or by transferring the rejected heat from first rectifier 16 to second generator 6 using a hydronic fluid heat exchange system.

In addition to the use of first loop rectifier heat to heat the second loop desorber, it has also been found advantageous to utilize heat values in the flue gas resulting from the burning of combustible materials 46 to heat generator 19. After leaving the area where generator 19 is operated, these gases can be used to heat directly the second loop strong solution in order to effect better the desorption process or they may be used to heat a hydronic fluid that in turn is used to heat second loop generator 6. Schematically the use of heat values from flue gases used after heating first loop generator are distinguished by a large arrow from generator 19 to generator 6.

In addition to the use of flue gas heat from the flue gas after heating desorber 19 and the use of rejected heat from first rectifier 16 to heat generator 6, rejected heat from condenser 10 and absorber 15 may also be used to heat generator 6 either by direct or hydronic fluid coupling. Although the following discussion refers to embodiments where these components are either all direct coupled or all hydronically coupled to second loop desorber 6, it is to be understood that combinations of both types of coupling may be used in a single system.

When used in the heating mode, the condenser 7 and absorber 4 reject heat to the heated space. In the low ambient case, absorbers 15 and 4 as well as condenser 7 reject heat to the heated space. In the heating mode, evaporator 13 and evaporator 2 draw heat from the environment. When used in the cooling mode, the absorber 4 and condenser 7 reject heat to the environment and the two evaporators (2 and 13) take heat from the cooled space. In both the heating and cooling mode, the heat exchange relationship between the components and the heated or cooled space may be either direct or indirect via a hydronic loop.

For the most effective thermodynamic combination of first loop 50 and second loop 60, the first condenser 10, first rectifier 16, first absorber 15, and the flue gas after the heating of desorber 19 should be at a higher temperature than second generator 6. This allows for the most effective utilization of the rejected heat from all of these components by generator 6. Also it is desirable to operate both cycles at temperatures and pressures so as to provide cooling at both evaporators, i.e., evaporator 13 and evaporator 2. However, it must be pointed out that the diagram in FIG. 2 is only intended for illustration purposes and does not serve to require or limit, for example, the operation of the second cycle 60 with the temperature and pressure boundaries of the first cycle 50 and, in fact, a wide range of operating parameters are contemplated by this invention. For example, if first loop 50 is operated at such temperatures as to preclude load cooling by evaporator 13, then it is possible to use evaporator 13 to cool absorber 4 and condenser 7. These requirements and design features will influence significantly the choice of refrigerant pairs used in both the first and second loops, 50 and 60, respectively.

When a salt solution of ammonia/sodium thiocyanate is used in the lower temperature cycle, crystallization must be avoided. Sensors are used to measure the temperature and pressure at the generator 6 exit to conduit 162. Flow rate to the generator 6 inlet through conduit 164 is adjusted so that for a given heat input from condenser 10, rectifier 16 and generator 19, solution concentration is maintained above a preset level.

Another consideration is the use of a non-volatile absorbent in the second (lower temperature) cycle. By using a non-volatile absorbent, additional heat loss via a second rectifier is avoided and the operating efficiency of the system is improved considerably. Additionally the elimination of the second rectifier component simplifies the overall system configuration.

Figure 3:
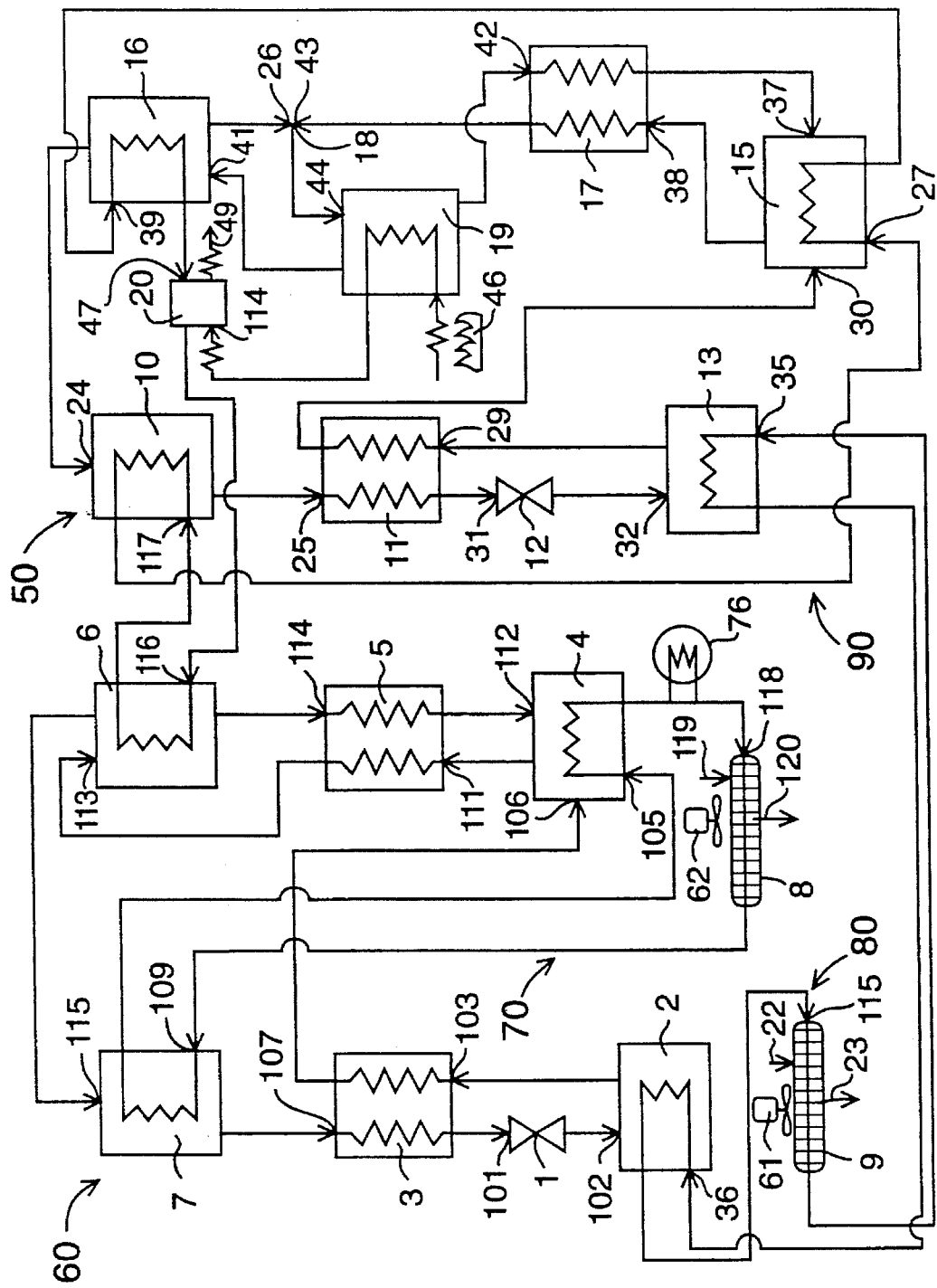
FIG. 3 is a schematic diagram of a dual cycle absorption machine with hydronic coupling among the various components.

FIG. 3 is a schematic diagram of a double loop system using ammonia/sodium thiocyanate as the refrigerant pair for the second (low-temperature) cycle and ammonia/water as the refrigerant pair for the upper (high-temperature) cycle. A suitable hydronic working fluid such as ethylene glycol/water with suitable corrosion inhibitors is used to transfer heat from the high-temperature (first) cycle 50 to the low-temperature (second) cycle 60. Generally the high-temperature components are found on the right side of the figure while the low-temperature components are on the left side of the figure.

Beginning with the high-temperature loop 50, cool strong solution from absorber 15 enters heat exchanger 17 at inlet 38 and is heated by weak solution returning from desorber 19. The heated strong solution enters tee 18 from inlet 43 where it is joined by condensed absorbent from rectifier 16 entering tee 18 from inlet 26. The combined solution flows enter the desorber at point 44 where they are heated by an external heat source 46. Heating separates the refrigerant vapor from a major portion of the absorbent after which the refrigerant vapor and remaining absorbent enter rectifier 16 at inlet 41. The absorbent vapor is condensed in the rectifier with rejection of heat after which it joins with the weak solution at inlet 26 to tee 18 for reentry into desorber 19. The pure refrigerant vapor from rectifier 16 enters condenser 10 at entry 24 where it is condensed to a hot liquid. Hot liquid refrigerant from condenser 10 enters heat exchanger 11 at inlet 25 where it heats cold refrigerant vapor from evaporator 13 and then proceeds to enter throttling valve 12 at inlet 31. The condensed refrigerant liquid then enters evaporator 13 at inlet 32 where it expands and evaporates.

Vapor and any residual refrigerant liquid enters heat exchanger 11 through inlet 29 where it picks up heat from the hot liquid refrigerant and then enters absorber 15 through entrance 30 where it combines with the weak solution coming into absorber 15 through inlet 37.

In the low-temperature (second) loop 60 shown generally on the left side of FIG. 3, cool strong solution from absorber 4 enters heat exchanger 5 at entry 111 and is heated by weak solution returning from generator (desorber) 6. The warm strong solution passes through inlet 113 to desorber 6 where it is heated by further hydronic fluid warmed by various components and flue gas from high-temperature absorption loop 50 including rectifier 16 as will be explained in more detail below. Heating separates the refrigerant vapor from the absorbent after which the refrigerant vapor passes through inlet 115 and enters condenser 7 where it is condensed to a hot liquid. It is to be realized that if an absorbent pair with a volatile absorbent, e.g., ammonia/water, is used in low-temperature cycle 60, a rectifier and rectification process similar to that used in the high-temperature cycle 50 is also employed in low-temperature (second) loop 60.

Hot liquid refrigerant from condenser 7 flows to inlet 107 and enters heat exchanger 3 where it is cooled by cold refrigerant vapor from evaporator 2 and then proceeds to enter throttling valve 1 through inlet 101. The condensed liquid then flows through entry port 102 and enters evaporator 2 where it expands and evaporates. The resulting vapor passes through inlet 103 and enters heat exchanger 3 where it picks up heat from the hot liquid refrigerant and then passes through entrance 106 and into absorber 4 where it combines with the weak solution coming into absorber 4 through inlet 112.

As noted previously, generator 6 in low-temperature loop 60 is heated by hydronic fluid (hydronic fluid circuit 90) with heat rejected by various components in high-temperature loop 50. The hydronic fluid network 90 is a closed system through which hydronic fluid circulates by means of a suitable liquid pump (not shown) in the following fashion: Cold hydronic fluid from generator 6 passes through inlet 117 and enters condenser 10 where it is warmed by rejected heat from the condensation process. The hydronic fluid then moves into absorber 15 through inlet 27 where it picks up additional heat from the absorption process taking place in absorber 15. The hydronic fluid is then fed into rectifier 16 through inlet 39 where it receives additional heat from the rectification process occurring in rectifier 16. Finally the relatively hot hydronic fluid passes into heat exchanger 20 through inlet 47 where it is heated further by the flue gases from the combustion process used to heat the high-temperature (first) desorber 19. The flue gases enter exchanger 20 through inlet 114, heat the hydronic fluid, and are exhausted to the atmosphere 49. Hot hydronic fluid enters generator 6 through inlet 116 where it supplies heat for the desorption process. A conventional solution pump (not shown) is used to circulate the hydronic fluid through conduits linking the various components of the heat transfer system.

Another hydronic system, hydronic 70 serves to remove heat from the low-temperature (second) loop 60. Rejected heat from second condenser and absorber 7 and 4 are removed by hydronic fluid that enters condenser 7 at inlet 109 where it is heated by rejected heat from second condenser 7 where it then enters absorber 4 through inlet 106 where it is further heated by rejected heat from absorber 4. The hot hydronic fluid then enters inlet 118 to radiator (heat exchanger) 8 where fan 62 moves air 119 across radiator 8 to expel heated air 120. In the cooling season, the air is expelled to ambient outside air while during the heating season, the hot air is used to heat the living space. This invention also contemplates the use of the rejected low-temperature condenser and absorber heat for other heating purposes such as the heating of a domestic water supply 76. In such instances, air cooled radiator 8 is still used to reject any excess heat that may not be needed to heat water supply 76.

A third hydronic fluid circuit 80 serves to cool the load, e.g., living space, by extracting heat from the load and using it to supply heat to the low-temperature (second) loop evaporator 2 and the high-temperature (first) evaporator 13. Warm hydronic fluid such as water/ethylene glycol with a suitable corrosion inhibitor passes from the load and first enters evaporator 13 through inlet 35 where heat is furnished for the evaporation process. The hydronic fluid then flows through inlet 36 to evaporator 2 where additional heat is given up to the evaporation process. Cold hydronic fluid then enters heat exchanger (radiator) 9 where warm air 22 from the load is directed over radiator 9 using fan 61 to provide cool air 23. During the heating season, the cool air 23 is rejected to ambient outdoor air.

Typically one of radiators 8 and 9 is located indoors and the other outdoors with hydronic fluid switching being provided for between hydronic loops 70 and 80. Also it is noted that evaporator 2 in FIG. 2 is shown to operate at higher temperature than evaporator 13 for illustrative purposes. When, in fact, an ammonia/water refrigerant pair is used for the first (high-temperature) loop 50 and ammonia sodium thiocyanate is used for second (low-temperature) loop 60, evaporator 2 operates at lower temperature than evaporator 13.

Figure 4:
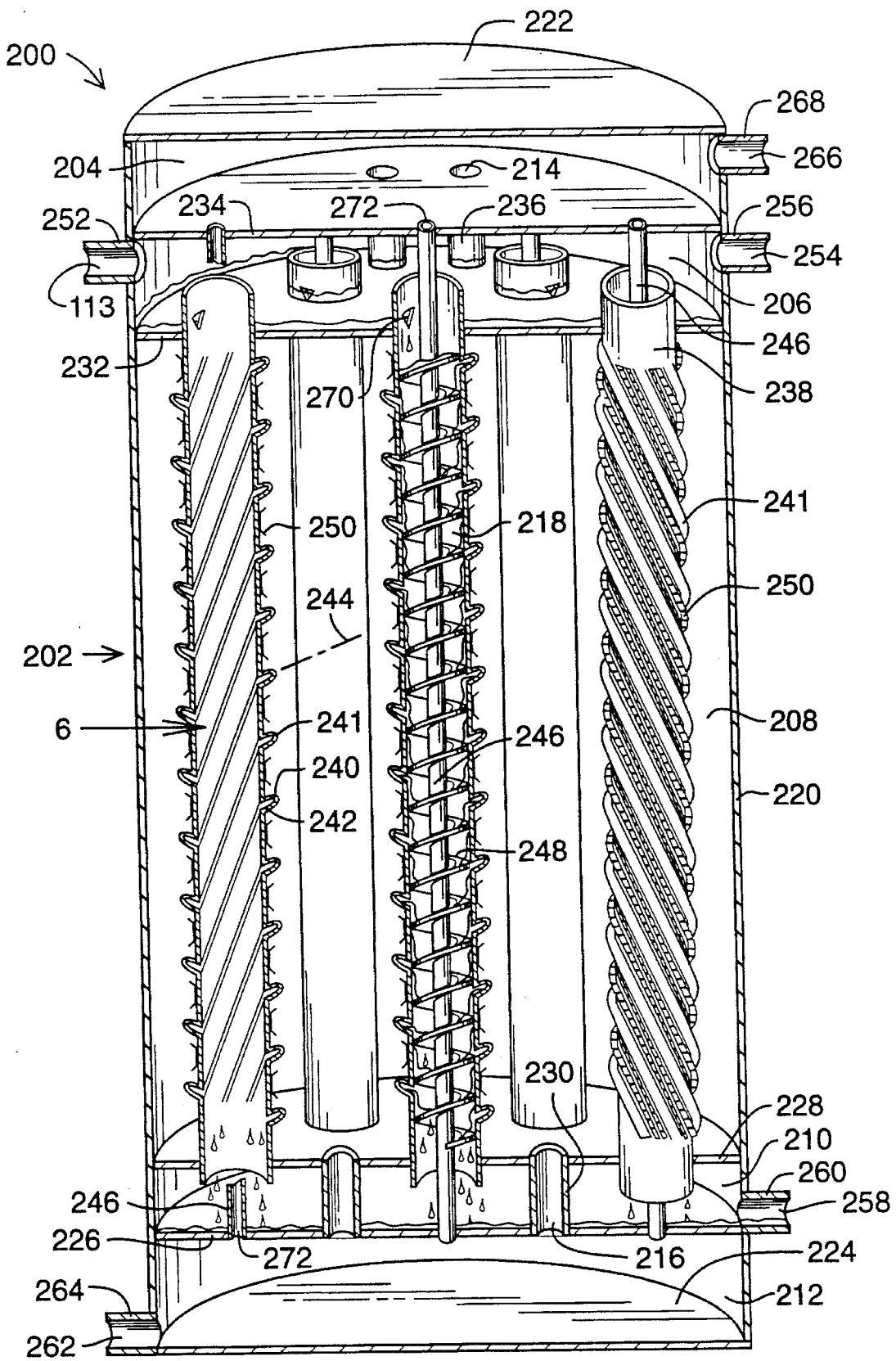
FIG. 4 is a cut-away perspective view of the low-temperature desorber coupled with a hydronic heat source.

FIG. 4 illustrates a detailed section of the low-temperature desorber configuration 200 in which a hydronic fluid is used to heat desorber 6. Desorber configuration 200 comprises a large chamber 202 having upper hydronic compartment 204, upper desorber compartment 206, intermediate hydronic compartment 208, lower desorber compartment 210, and lower hydronic compartment 212. The lower hydronic compartment 212 is connected to the intermediate hydronic compartment 208 by one or more passages 216 formed by tube 230 while the intermediate compartment 208 is connected to the upper hydronic compartment 204 by one or more passages 214 formed by tube 236. The lower hydronic compartment 212 and the upper hydronic compartment 204 may also be connected by one or more passages 272 formed by tube 246. The upper desorber chamber 206 and the lower desorber chamber 210 are connected by one or more passages 218 formed by twisted, fluted tube (vertical tube) 238.

Large chamber 202 is formed from large vertical cylinder 220 enclosed by upper end 222 and lower end 224. Lower hydronic chamber 212 is formed from a lower portion of cylinder 220, lower end 224 and circular bulkhead 226. Lower desorber chamber 210 is formed from a lower portion of cylinder 220 above the portion used to form lower hydronic chamber 212, the upper side of circular bulkhead 226 and the under side of circular plate (bulkhead) 228. The intermediate hydronic chamber is formed from the center section of cylinder 220, the upper side of circular bulkhead 228, and the lower side of circular bulkhead 232. The upper desorption chamber 206 is formed from an upper section of cylinder 220 immediately above the center section used to form the intermediate hydronic chamber 208, the upper side of bulkhead 232 and the lower side of bulkhead 234. The upper hydronic chamber is formed from the upper portion of cylinder 220 above the upper desorber chamber 206, end plate 222 and the upper side of bulkhead 234.

Bulkheads 226 and 228 are joined by vertical cylindrical tube 230 which forms passage 216 between the lower and intermediate hydronic chambers 212 and 208. Bulkheads 232 and 234 are joined by vertical tube 236 which forms passage 214 between the intermediate and upper hydronic chambers 208 and 204, respectively.

Figure 12:
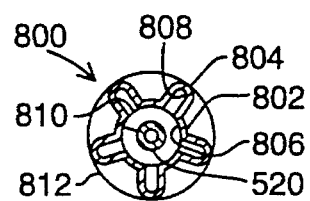
FIG. 12 is a cross sectional view of a five start tube with an open tube and fin use as the longitudinal member.

Bulkheads 232 and 228 are joined by one or more vertical, twisted fluted tubes 238. As shown in the cross-sectional view of FIG. 12, a twisted fluted tube 800 is a tube comprising a tube with longitudinal flutes (depressions or troughs) 802 and adjacent longitudinal ridges or crests 804 on the exterior tube surface giving rise to complimentary ridges or crests 806 and complimentary flutes 808 on the interior tube surface. The tube is twisted so that the flutes and crests form both internal and external helices about the longitudinal axis of the tube. The internal helix is shown as circle 810, which represents the rotation of crest 806 into the page, while the outer helix is shown as circle 812, which represents the rotation of crest 804 into the page. Varying numbers of flutes (crests) can be used with a particular tube. The number of flutes or crests are referred to as "starts." Thus a tube with five flutes (and five crests) as shown in FIG. 12 is referred to as a five start tube. Twisted fluted tubes are available commercially from suppliers such as Turbotec Products, Inc., Windsor, Conn. and Delta-T Limited, Tulsa, Okla.

With regard to vertical fluted tube 238 (FIG. 4), it is formed so that the flutes have an angular downward bias with respect to the radius of the tube. In the present device, internal portion 242 of inner flute 240 is oriented to slope downward as indicated by line 244. This allows liquid to readily drain out of the internal flute 240, that is, it has a downward emptying bias. Preferably, twisted, fluted tube 238 is a five start tube. The twisted fluted tube 238 forms passage 218 between the upper and lower desorber chambers 206 and 210. The exterior surface of tube 238 may be further augmented with heat exchange fins 250 wound in a helical fashion about the exterior surface of tube 238 between the helical tube wall crests 241. Finally it is noted that the crests and fins of the background tubes in FIG. 4 have been omitted for the sake of clarity.

The upper end of fluted tube 238 extends a short distance above the upper side of bulkhead 232 to assist in providing an even distribution of fluid among all tubes when several fluted tubes 238 are used in a particular component. Each tube has an inverted triangular opening 270 positioned with the apex of the triangle being at the same level and at or above the upper edge of bulkhead 232. Although this is the preferred way of metering liquid into several tubes 238, it is to be understood that there are other ways of accomplishing uniform fluid distribution to multiple sites which can be used in the present invention. When using such methods, it may be unnecessary or even inconvenient to extend tubes 238 above bulk head 232. Such extension is not required for full and effective use of this invention.

A passage 113 to the upper desorber compartment 206 is formed in cylindrical wall 220 by tube 252. Tube 252 is located above the bottom of compartment 206 to allow for the metering of liquid into tubes 238. A passage 254 out of upper desorber compartment 206 is formed in cylindrical wall 220 by tube 256 which is located near the top of compartment 206. A passage 258 out of lower desorber compartment 210 is formed in cylindrical wall 220 by tube 260. A passage 262 into lower hydronic compartment 212 is formed in cylinder wall 220 by tube 264. A passage 266 out of upper hydronic compartment 204 is formed by tube 268.

A concentric vertical tube 246 is positioned within fluted tube 238 and joins bulkheads 234 and 226 to form passage 272 which joins lower and upper hydronic compartments 212 and 204, respectively. A helical fin 248 extends from the exterior surface of tube 246 for a sufficient distance so as to contact the inner surface of fluted tube 238.

In operation, desorber configuration 200 is used to heat desorber 6 with hydronic fluid from hydronic fluid circuit network 90 (FIG. 3). The hydronic fluid circulates through condenser 10, absorber 15, rectifier 16, where it picks up rejected heat from each of these components. It then is further heated by the flue gases coming from the combustion of natural gas used to heat desorber 19. As seen in FIG. 4, the hot hydronic fluid enters lower hydronic fluid compartment 212 through passage 262 formed by tube 264. Hydronic fluid leaves lower hydronic compartment 212 through passage 216 formed by tube 230 and enters into intermediate hydronic fluid compartment 208 where it completely surrounds the exterior surface of desorber tube 238 and transfers heat inwardly to the desorption process occurring within tube 238. Hydronic fluid may also pass through passage 272 formed by tube 246 located at the center of desorber tube 238 where it transfers heat radially outward through the wall of tube 246 with such heat transfer being further augmented by helical spiral fin 248. From passage 272 the hydronic fluid passes into upper hydronic compartment 204.

Crests 241 further assist in the inward heat transfer from the hydronic fluid to desorber 6. Depending on heat exchange conditions, fins 250, which are located between the helical crests 241 of tube 238, may also be used to promote heat transfer. Hydronic fluid leaves the intermediate hydronic fluid chamber 208 through passage 214 formed by tube 236 and enters upper hydronic fluid compartment 204 where it merges with the hydronic fluid from passage 272 and then leaves compartment 204 through passage 266 formed by tube 268. The hydronic fluid then passes to condenser 10 (FIG. 3).

Simultaneously, strong solution for the desorption process enters the upper compartment 206 of desorber 6 through passage 113 formed by tube 252 to form a layer of strong solution liquid at the bottom of compartment 206. A small inverted triangular opening 270 in each of the desorber tubes 238 allows an even distribution of fluid among the several tubes 238. As the strong solution starts down the inside of tube 238 due to gravitational forces, it encounters helical fin 248 over which it spreads exposing a large surface area of strong solution. Strong solution also enters the open area 242 of flute 240 and begins a downward flow in helical open area 242. Because flute 240 is open with a downward emptying bias, solution tends to spill from the flute effectively wetting the inside wall of tube 238. In addition, when opening 242 is immediately above fin 248, strong solution also spills onto the upper surface of fin 248. As a result of the combination of inner helical flute 240 and fin 248, a very effective high surface producing and renewing combination is formed.

Figure 10:
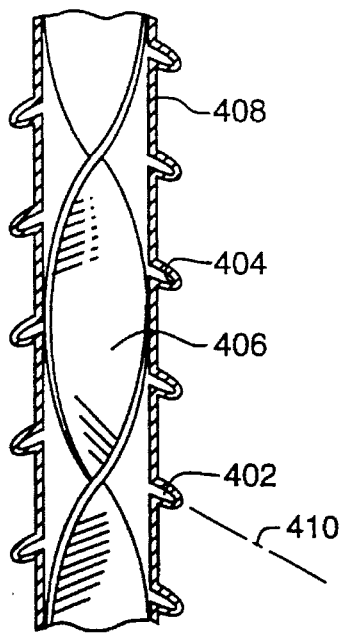
FIG. 10 is a cut-away view of an alternate embodiment of a vertical tube using a twisted ribbon for interior fluid distribution.
Figure 11:
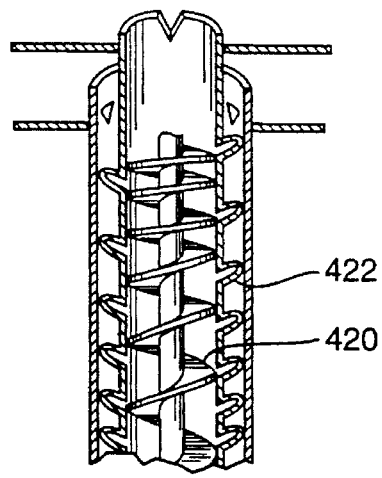
FIG. 11 is a cut-away view of a vertical tube showing the variable pitch of both tube wall crests and the longitudinal member (auger) fin.

This invention also contemplates embodiments such as those shown in FIGS. 10 and 11. In FIG. 10, the flutes 404 and spaces 402 are biased in an upward direction as indicated by line 410 and thus require some filling of space 402 with liquid prior to spilling over and wetting of the interior wall of tube 408. Also it is possible to use a twisted ribbon 406 for fin 248 within tube 408 with the edges approaching or contacting the inner wall of tube 408 so as to also receive liquid from space 402. FIG. 11 illustrates the use of a variable pitch fin 420 and a variable pitch crest 422 where pitch is defined as the distance between each successive turn of a crest or fin. It is noted that pitch is defined in terms of the distance between a particular crest or fin rather than between adjacent crests or fins as might occur in multiple start tubes or augers. It is further noted that pitch may increase in either an upward and downward direction depending on the use in a particular configuration.

Returning to FIG. 4, heat from the hydronic fluid flowing on the outside of tube 238 causes refrigerant vapor to be expelled from the strong solution wetting the inside wall of tube 238. Similarly heat from the hydronic fluid flowing in passage 272 heats fin 248 as does the hydronic fluid flowing outside of tube 238 as a result of the contact of fin 248 with tube 238. Such heating expels refrigerant vapor from the strong solution on fin 248. The expelled refrigerant vapor flows upward in the spaces between the helical fin 248 leaving tube 238 through the upper end of tube 238 and enters compartment 206 where it then leaves through passage 254 formed by tube 256 and proceeds to inlet 115 of condenser 7 (FIG. 3). A fin 248 with increasing upward pitch can be used to maintain an optimal vapor velocity providing a more uniform liquid-vapor equilibrium throughout the desorber configuration. On reaching the bottom of tube 238, the absorbent, essentially devoid of refrigerant vapor, collects in the bottom of compartment 210 and leaves through outlet 258 formed by tube 260 and proceeds to inlet 114 of heat exchanger 5 (FIG. 3).

Figure 7:
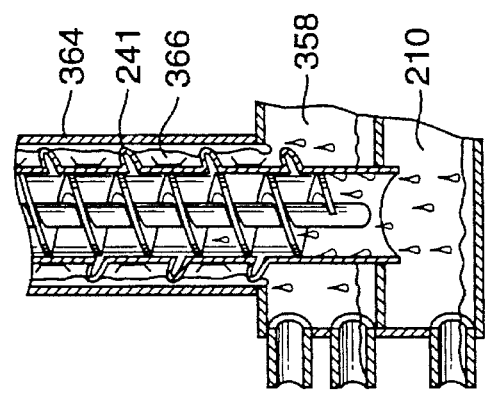
FIG. 7 is a cut-away perspective view of another embodiment of the direct coupled high-temperature rectifier and low-temperature desorber in which the outside crests of the fluted tubes are not in contact with the surrounding, rectifier forming tube.
Figure 6:
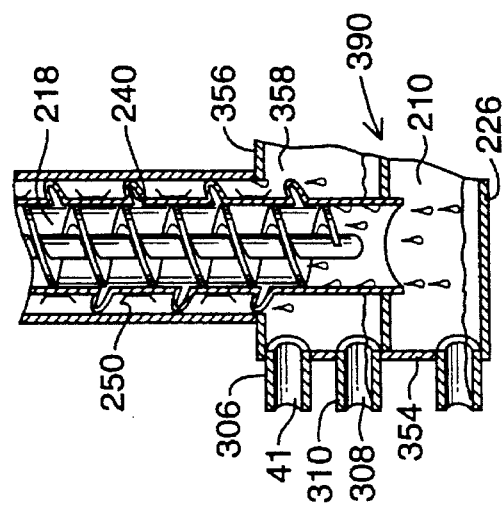
FIG. 6 is a partial, cut-away perspective view of another embodiment of the direct coupled high-temperature rectifier and low-temperature desorber in which the outside crests of the fluted desorber tube are in contact with their surrounding, rectifier-forming tube.
Figure 5:
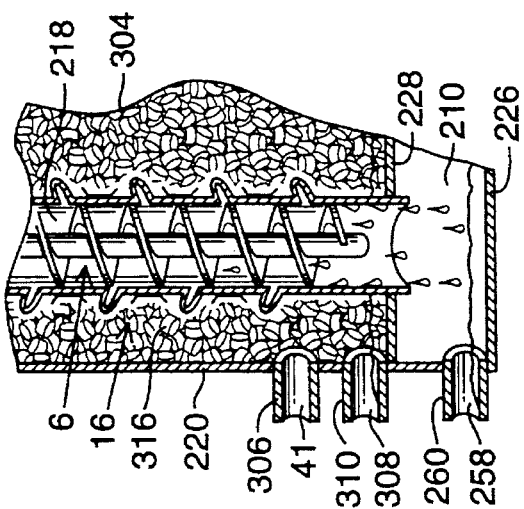
FIG. 5 is a partial, cut-away perspective view of a low-temperature desorber direct coupled to a high-temperature rectifier using Rashig rings.

Improved operating efficiencies may be obtained by a direct coupling of the high-temperature rectifier 16 with the low-temperature desorber 6. FIGS. 5–7 show various embodiments of this invention in which the high-temperature rectifier 16 is direct coupled with low-temperature desorber 6. The overall arrangement and construction of the direct-coupled, rectifier/desorber configuration is, in many ways, similar to the indirect coupling configuration shown in FIG. 4 and, unless otherwise noted, much of the above description for FIG. 4 is also applicable to the following configurations. The same numbers are used for similar parts as appropriate.

FIG. 5 illustrates a direct-coupled absorber configuration 300 consisting of a direct-coupled rectifier 16 and a low-temperature desorber 6. Configuration 300 consists of a large chamber 320 formed from cylinder 220 and bulkheads 226 and 234 which serve as the ends of large chamber 320. The upper portion of cylinder 220, end bulkhead 234, and bulkhead 232 define upper desorber chamber 206. Similarly, the lower portion of vertical cylinder 220, bulkhead 226 and bulkhead 228 form lower desorber chamber 210. Bulkheads 228 and 232 plus the center portion of vertical cylinder 220 form rectifier compartment 316. Vertical tube 238 defines passage 218 between upper desorber compartment 206 and lower desorber compartment 210. Unlike tube 246 in FIG. 4, tube (or shaft) 302 is closed.

Strong solution enters desorber compartment 206 through passage 113 formed by tube 252. Strong solution accumulates in the bottom of compartment 206 where it is metered into one or more desorber tubes 238 through inverted triangular opening 270. On entry into tube 238, the strong solution flows downward due to the forces of gravity wetting the walls of the inside of tube 238 and fin 248. Refrigerant vapor is expelled from the strong solution as a result of heat transfer from the rectification process occurring in adjacent rectification chamber 316 to the inner wall of tube 238 and to fin 248 as a result of the contact of fin 248 with tube 238. Downward sloping flute 240 further assists in exposing new surface areas and continually wetting the inside wall of 238 and fin 248 to further augment the expulsion of refrigerant vapor from the strong solution. On reaching lower desorption chamber 210, the solution is essentially devoid of refrigerant vapor and exits to heat exchanger 5 through exit passage 258 which is formed by tube 260.

Rectification takes place in high-temperature rectifier 16 as follows. Refrigerant vapor and a portion of absorbent vapor from the high-temperature desorber 19 (FIG. 3) enter into the rectification compartment 316 through one or more passages 41 formed by one or more tubes 306. Rectification chamber 316 is filled with suitable packing material such as Rashig rings 304 to promote the fractional distillation of the refrigerant and absorber vapors so as to result in the condensation of absorbent vapor. Heat produced on condensation of the absorbent vapor is transferred to the desorption process occurring in passage 218 through the walls of fluted tube 238 with the heat transfer being further augmented by tube wall crests 241 and fins 250 which project from the exterior wall of 238 between the projecting crests 241. Condensed liquid absorbent flows downward through Rashig rings 304 under the influence of gravity and accumulates in the bottom of rectifier compartment 316 and is returned to desorber 19 through passage 308 formed by tube 310. Refrigerant vapor passes upward through the Rashig rings 304 in compartment 316 and exits through passage 312 formed by tube 314 and proceeds to condenser 10 (FIG. 3).

FIG. 6 illustrates another direct coupling desorber configuration 350. Configuration 350 promotes more effective heat transfer from the rectification process to the desorption process by eliminating the large, vertical chamber 316 filled with Rashig rings 304 (FIG. 5) and replacing it with one or more individual tubes 364 that are concentric with and surround one or more desorption process tubes 238.

Configuration 350 consists of two large interconnected chambers 380 and 390. Chamber 380 is formed from large vertical cylinder 352, upper bulkhead 234 and lower bulkhead 360. Large lower chamber 390 is formed from large vertical cylinder 354, upper bulkhead 356 and lower bulkhead 226. The large upper chamber 380 is further divided into an upper desorption chamber 206 and a lower rectification chamber 362. Similarly, the large lower chamber 390 is divided into an upper rectification chamber 358 and a lower desorption chamber 210. Upper desorption chamber 206 and the lower desorption chamber 210 are interconnected by passage 218 formed by twisted fluted tube 238. The upper rectification chamber 362 and lower rectification chamber 358 are interconnected by one or more helical passages 366 formed by tube 364, tube wall crests 241 and tube 238.

The further details of the construction and operation of desorber 6 have been previously set forth in the above description for FIGS. 4 and 5. With respect to the rectification process, refrigerant vapor from desorber 19 and a portion of the absorbent vapor enter the lower rectification chamber 358 through passage 41 defined by tube 306 and feed into passage 366 defined by the inner wall of tube 364, the outer wall of fluted tube 238, and crests 241. It is noted that the outermost radial portion of crest 241 is in contact with the inner wall of tube 364. Refrigerant and absorbent vapor are forced to circulate in a spiral configuration in the one or more passages 366 formed by one or more spiral crests 241, the outer wall of tube 238 and the inner wall of tube 364. As a result, heat liberated as the absorbent vapor condenses is passed through tube 238 to the desorption process occurring in desorber 6. Further augmenting the heat transfer process are fins 250 projecting from vertical tube 238 between spiral, tube wall crests 241. The absorbent vapor condenses and spirals downward on the upper edge of crest 241 due to the force of gravity and collects in lower rectification compartment 358 and then leaves compartment 358 through exit 308 formed by tube 310.

Refrigerant vapor continues upward in a spiral fashion in one or more passages 366 about vertical tube 238 and eventually enters into upper rectification compartment 362 where it leaves the compartment through passage 312 formed by tube 314. The vapor then passes to inlet 24 of condenser 10 (FIG. 3).

FIG. 7 is an alternate embodiment 370 of the direct coupling desorber configuration 350 illustrated in FIG. 6. Desorption configuration 370 is identical with that shown in FIG. 6 except that the outermost radial tip of crest 241 is separated by a small distance from the interior wall of tube 364. The distance between the outermost tip of crest 241 and the inner wall of tube 364 is of such length that the condensing absorbent vapor on the interior wall of tube 364 contacts the outermost radial portion of crest 241 and provides a barrier to the refrigerant vapor forcing it to travel in a helical path in the one or more passages 366 formed by the liquid, the helical tube wall crests 241, and the inner and outer walls of tubes 364 and 238, respectively, thereby further promoting heat transfer to the desorption process occurring within tube 238. By maintaining the cooler condensate on the inside wall of tube 364, more effective heat transfer is effected as a result of the elimination of a heat transfer barrier formed by the condensing absorbent vapor on the outer wall and crests 241 of vertical tube 238. The insulating condensate barrier on the inner wall of tube 364 also tends to promote greater heat transfer to tube 238 and the desorption process taking place within the tube.

Figure 8:
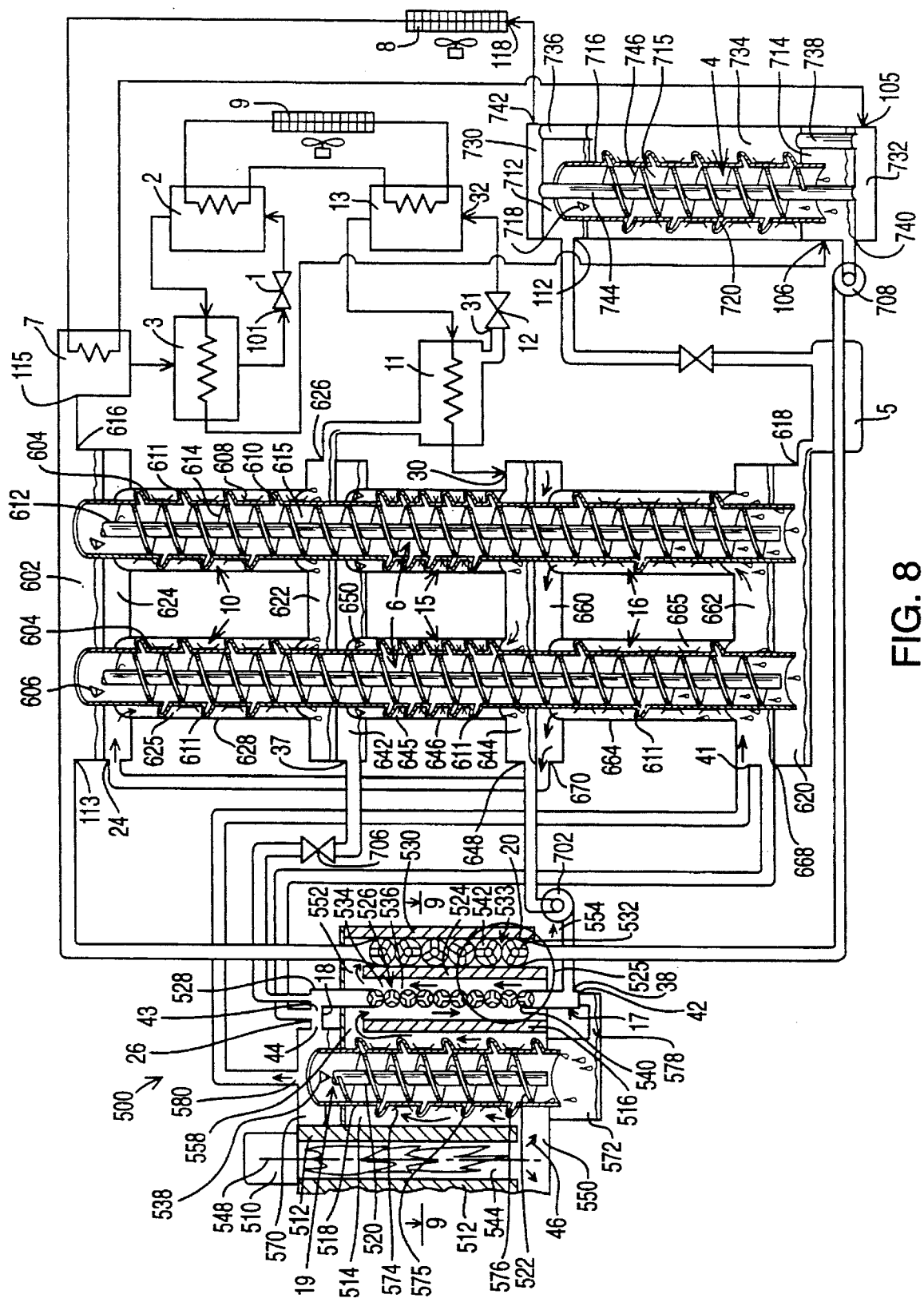
FIG. 8 is a cut-away perspective view with various schematic components showing various direct-coupled features of this invention.

FIG. 8 illustrates direct coupling of the high-temperature rectifier 16, the high-temperature condenser 10, and the high-temperature absorber 15 with the low-temperature generator 6. FIG. 8 also illustrates the generator package 500 in which the flue gas from the heating of the high-temperature generator 19 is used further to heat the low-temperature strong solution so as to better effect the low-temperature desorption occurring in generator 6. Finally, FIG. 8 illustrates the overall arrangement and connection of components in a dual cycle absorption machine of this invention.

Figure 9:
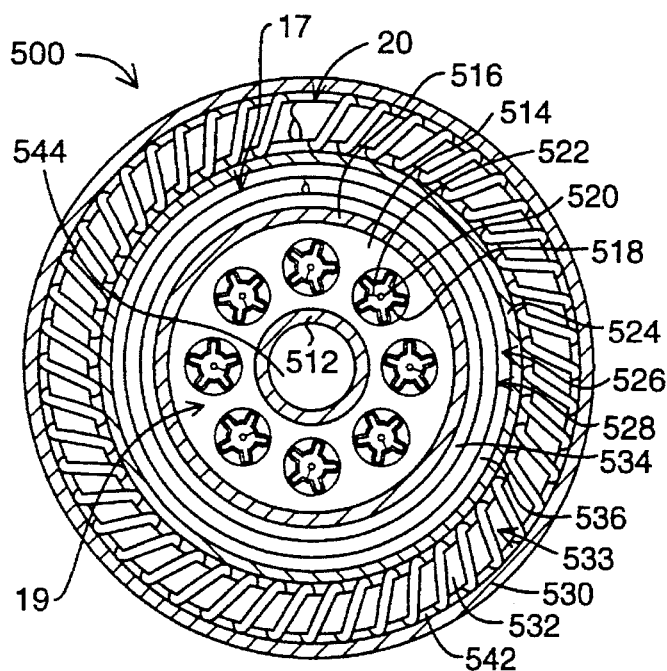
FIG. 9 is a cross sectional view taken along 9—9 of FIG. 8 showing the heating configuration for the first and second loop generators and first loop strong and weak solution heat exchange.
Figure 13:
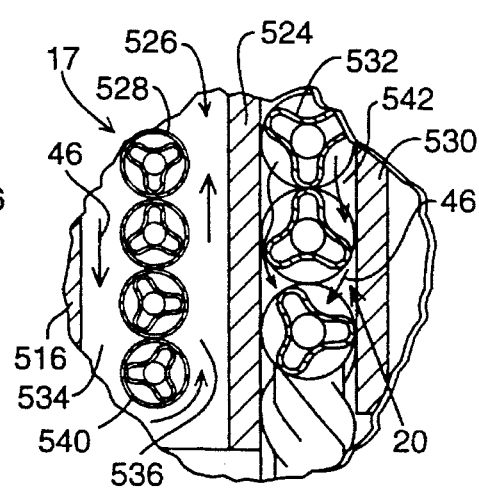
FIG. 13 is a fragmentary view of section 525 in FIG. 8.

The overall layout of the generator package assembly 500 is seen in FIG. 9, which is a full perspective cross-section taken along line 9—9 in FIG. 8. As seen in FIG. 9, the generator package 500 is laid out in the following general arrangement. A power burner directs hot combustion gases downward in passage 544 located at the center of the package and formed by vertical and cylindrical baffle 512. Concentric vertical baffles 512 and 516 form the high-temperature generator compartment 514 which houses the high-temperature generator 19. High-temperature generator 19 comprises a set of twisted fluted vertical generator tubes 518 arranged so as to be equally spaced apart in a circular configuration within the high-temperature generator compartment 514. Within each desorber tube 518 is an inner concentric tube 520 from which extends helical fin 522.

Concentric vertical cylindrical baffles 516 and 524 form the heat exchange compartment 526 in which is located heat exchanger 17 comprising outer tube 528. Tube 528 is wound in a helix about the center of the generator package with the juxtaposed coils of the helix in direct contact with each other. The entire helical winding is placed within heat exchange compartment 526 so as to afford a passage on both sides of the helical winding of tube 528. These passages are designated as inner passage 534 and outer passage 536.

Vertical concentric baffle 524 and concentric outer wall 530 form a low-temperature strong solution heating compartment 533 in which twisted fluted tube 532 is wound in a vertical helix about the center of package 500 with juxtaposed coils of the helix in contact with each other and with the outer wall of baffle 524 and the inner wall of wall 530.

Referring to FIGS. 8, 9, 12 and 13, the desorber package 500 is further configured as follows: As shown in FIG. 8, central passage 544 is formed by cylindrical baffle 512 with hot combustion gases 46 from downward firing power burner 510 passing downward and then through openings 550 at the base of cylindrical baffle 512 into high-temperature generator compartment 514 where they move in a generally upward direction around and among high-temperature generator tubes 518. Inner, high-temperature desorber tube 520 may be an open center tube (FIG. 12) that is configured so as to allow hot combustion gases 46 to circulate through it from bottom to top. The flue gases from compartment (chamber) 514 then pass through openings 558 near the top of baffle 516 into the inner passage 534 of heat exchanger compartment 526 where they flow downward along the helical coil of heat exchanger 17.

Heat exchanger 17 consists of a smooth outer wall tube 528 and an inner concentric spiral fluted tube 540 arranged in conventional tube-in-tube fashion. The tubular exchanger 17 is wound in a vertical helix about center line 548 with the juxtaposed coils of the helical winding in contact with each other thereby forming a wall of coil windings and forcing flue gas downward in the inner passage 534 formed by the outer wall of vertical cylindrical baffle 516 and the helix of contacting juxtaposed coils of exchanger 17. On reaching the bottom of passage 534, the hot flue gas proceeds under the helical coil of exchanger 17 and then upward in passage 536 formed by the helical spiral of contacting coils and the inner wall of vertical cylindrical baffle 524. Openings 552 at the top of vertical cylindrical baffle 524 allow the flue gases to enter compartment 533. Compartment 533 contains the strong solution heating coil which consists of a twisted fluted tube 532 which is wound in a helical coil about axis 548 with the juxtaposed coils being in contact with each other and in contact with the outer wall of vertical, cylindrical baffle 524 and the inner side of outer housing wall 530. As such, the flue gas 46 is forced over and around the coils in cross flow to the bottom of compartment 533 at which point they exit from compartment 533 through openings 554 provided in the bottom of outer wall 530.

In summary, flue gas 46 enters high generator compartment 514 through lower baffle openings 550. There, it circulates in and around desorber tubes 518 in a generally upward direction leaving high-temperature desorber compartment 514 through openings 558 in the upper portion of baffle 516. From openings 558, the flue gas moves downward along the inside of heat exchanger coiled tube 528 in passage 534. At the bottom of coiled tube 528, flue gas 46 passes beneath the coil and then proceeds upward along the outside of helical coil 528 in passage 536 passing upward and out of exchanger compartment 526 through openings 552 in the upper portion of baffle 524. From openings 552, flue gas 46 proceeds in cross-flow down and through the passages 542 formed between and among the twisted fluted tube coils of heating coiled tube 532. On reaching the bottom of compartment 533, the cooled flue gas leaves the generator package through openings 554 in the lower portion of wall 530.

The high-temperature desorber has been partially described with respect to the above description for FIG. 9. Referring to FIG. 8, it is noted that the high-temperature desorber 19 consists of an upper compartment 570 and a lower compartment 572 which are connected by desorber tube 518. Desorber tube 518 contains an inverted fluid metering triangle 538 near the top and additional heat exchange fins 574 that extend from desorber tube 518 in a helical fashion between projecting crests 575. An exit 578 is provided for hot weak solution in the lower desorber compartment 572. A strong solution entrance 44 and a refrigerant (and absorbent) vapor exit 580 are provided in the upper high-temperature desorber compartment 570.

Heat exchanger 17 is of usual tube-in-tube construction, that is, a twisted fluted tube 540 is contained within a tube 528 so that the flutes of twisted fluted tube 540 contact the inner wall of round tube 528. Hot weak solution from the high-temperature generator 19 enters inner fluted tube 540 through inlet 42 and heats the strong solution coming from the high-temperature absorber and entering into outer tube 528 through inlet 38.

Heat exchanger 20 which heats strong solution from absorber 4 to effect desorption is of twisted, fluted tube-in-cylinder construction. In this type of construction, fluted tube 532 is wrapped in helical coils about center line 548 with each of the juxtaposed coils contacting each other and also contacting the inner walls of baffle 524 and wall 530 so as to require crossflow across the coils in a direction generally parallel to the center line 548 of the coils. Tube-in-cylinder construction is more fully described in U.S. Pat. No. 5,339,654 all of which is incorporated herein by reference as if completely written herein.

Cool, high-temperature, strong solution from pump 702 enters heat exchanger 17 through inlet 38 into the outer coiled tube 528 of exchanger 17 where it is heated by the hot weak solution flowing through the inner coil tube 540 and by the hot flue gases circulating on both the inner side and outer side of the helical heat exchanger configuration. The heated strong solution enters tee 18 at inlet 43 where it is joined by absorbent condensate from rectifier 16 entering tee 18 through inlet 26. The combined stream of absorbent and strong solution then enters the high-temperature desorber 19 through inlet 44. The solution passes through inverted metering triangle 538 and flows down the inner wall of desorber tube 518 with desorption being facilitated by the interaction of fin 522 and flutes 576 which continually provide new and fresh surface areas of solution. As weak refrigerant is expelled due to the hot combustion gases 46 transferring heat through tube 518 and through the center of tube 520 if used (FIG. 13), refrigerant is expelled and travels upward leaving tube 518 and passing out of the desorber chamber 570 through exit port 580. Weak solution leaves the bottom of desorber tube 518 and accumulates in the bottom of desorber compartment 572 where it then enters inlet 38 of the inner heat exchange tube 540 to heat the incoming strong solution. The hot, weak solution then leaves exchanger 17 and passes to throttling valve 706.

Strong solution from low-temperature absorber 4 is pressurized by pump 708 and passes through heat exchanger 5 and into heating tube 532 where it is heated by the flue gas 46 previously used to heat high-temperature desorber 19. The heated strong solution then passes to low-temperature desorber 6. Low-temperature desorber 6 consists of upper low-temperature desorber compartment 602, a lower low-temperature desorber compartment 620 and fluted tube 604 which connects upper absorber compartment 602 and lower desorber compartment 620. Low-temperature desorber tubes 604 further comprise inverted triangle metering passages 606 and an inner concentric shaft (rod or closed tube) 612 with projecting helical fin 614 in contact with the inner wall of desorber tube 604. Desorber tube 604 is a twisted fluted tube with inner flutes 610 and complimentary outer crests 611 with fins 608 projecting from the outer surface of tube 604 in the area between the helical crests 611.

Heated strong solution from fluted tube 532 of the generator configuration 500 enters the low-temperature desorber 6 compartment 602 at entry 113. It passes through inverted metering triangles 606 after which it proceeds downward due to the forces of gravity coating the inside wall of tube 604 and fin 614. The solution surfaces are constantly being freshly renewed as a result of the interaction of fin 614 and downward projecting flutes 610. To maintain the increase volume of vapor at about the same velocity as it progresses upward through indirect helical passage 615 and thereby maintain vapor-liquid equilibrium conditions throughout generator 6, fin 614 may be provided with a variable pitch that increases in an upward direction. That is, the space between each fin turn increases toward the top of vertical tube 604.

High-temperature condenser 10, high-temperature absorber 15, and high-temperature rectifier 16 all directly transfer heat to low-temperature desorber 6 thereby expelling refrigerant vapor which passes upward exiting from the top of tube 604 and leaving the low-temperature desorber compartment 602 through exit 616 passing into the low-temperature condenser 7 through entry port 115. On reaching the bottom of desorber tube 604, all of the refrigerant vapor has been expelled from the strong solution resulting in the emergence of weak solution at the bottom of tube 604 which collects in lower desorber compartment 620 and subsequently leaves through exit port 618.

The strong solution flowing down the inner wall of desorber tube 604 is first heated by the condensation of high-temperature refrigerant vapor in condenser 10. Condenser 10 consists of an upper high-temperature condenser compartment 624 and a lower condenser compartment 622. Upper condenser compartment 624 is immediately adjacent to and below low-temperature desorber compartment 602 while high-temperature condenser compartment 622 is immediately adjacent to and above upper absorber compartment 642. The upper high-temperature condenser compartment 624 and lower high-temperature condenser compartment 622 are joined by condenser tube (cylinder) 628 which surrounds and is concentric with desorber tube 604. The inside wall of condenser tube 628 is in direct contact with the projecting crests 611 of desorber tube 604.

High-temperature cycle refrigerant vapor from rectifier 16 enters compartment 624 of condenser 10 through inlet 24 where it passes downward through the spiral spacings 625 formed by the contact of crests 611 with the inner wall of condenser 628. As the refrigerant vapor passes downward in helical passages 625, it gives up heat to the desorption process occurring in tube 604 and condenses on the outer wall and helical crests 611 of tube 604 continuing to pass downward due to the force of gravity and accumulating in lower condenser compartment 622 from which it passes to heat exchanger 11 through exit port 626.

The high-temperature absorber 15 serves to heat the desorption process occurring in tube 604 after heating by high-temperature condenser 10. The high-temperature absorber consists of an upper compartment 642 and a lower compartment 644 which are joined by absorber tube (cylinder) 646. Tube 646 extends slightly above the bottom of compartment 642 and has inverted triangular openings 650 to meter weak strong solution into the separate passages 645 formed by the inner wall of tube 646 in contact with crests 611 projecting from desorber tube 604.

Weak solution from the generator package 500 is throttled to low pressure through throttling valve 706 and enters absorber 15 through inlet 37 where it accumulates in the bottom of absorber compartment 642. It is metered into absorber tube 646 through inverted triangular openings 650 and flows downward under the influence of gravity circulating about desorber tube 604 in the passages 645 between projecting crests 611 which contact the inner wall of absorber tube 646. Refrigerant vapor enters lower absorber compartment 644 through inlet 30 and proceeds upward in the spaces 645 formed by the inner wall of tube 646, the outer wall of tube 604, and projecting crests 611. Refrigerant vapor travels upward in a helical path between crests 611 being absorbed in the downward moving weak solution. On reaching the bottom of tube 646, the weak solution has absorbed all of the incoming refrigerant vapor and accumulates in the bottom of compartment 644 where it leaves through exit 648 and passes to pump 702.

After the low-temperature desorption process occurring in tube 604 is heated by high-temperature absorber 15, it is then heated by high-temperature rectifier 16. Rectifier 16 comprises an upper high-temperature rectification compartment 660 immediately adjacent to and below absorber compartment 644 and lower rectification compartment 662 immediately above lower desorber compartment 620. Compartments 660 and 662 are joined by tube (cylinder) 664 which is concentric with desorber tube 604. Crests 611 of desorber tube 604 project outward and contact the inner wall of rectifier tube 664. Hot refrigerant vapor containing some absorbent vapor enters the lower rectification chamber 662 through inlet 41 and proceeds to travel upward in the helical passages 665 formed by helical crests 611, the inner wall of tube 664 and the outer wall of tube 604. As the vapor travels upward in its helical path, the volatile absorbent vapor condenses and transfers heat to the desorption process occurring in tube 604. As the absorbent vapor condenses, it spirals downward on crest 611 of the desorption tube 604 emerging from the bottom of tube 604 and accumulating in the lower rectification compartment 662. The condensed, absorbent vapor leaves the compartment 662 through outlet 668 and is merged with the strong solution entering high-temperature desorber 19 at tee 18. The refrigerant vapor continues upward and emerges into upper rectification compartment 660 where it exits through outlet 670 and proceeds to inlet 24 of condenser 10.

To accommodate the various processes in condenser 10, absorber 15 and rectifier 16, it is desirable to use a different number of starts (separate helical crests 611) for each portion of tube 604 in direct heat exchange with a different process component using, for example, a start ratio of 3:6:2 for condenser 10, absorber 15, and rectifier 16. Further it may be desirable to use a variable pitch crest 611 for each of these sections using, for example, an increasing upward pitch for crests 611 in condenser 10 and an increasing downward pitch for crests 611 in absorber 15 and desorber 16. Similarly it may be desirable to increase the pitch in an upward fashion for fin 614 in desorber 6.

To complete the high-temperature cycle, liquid refrigerant leaves condenser 10 through outlet 626 and enters heat exchanger 11 where it is cooled by the expanded and vaporized refrigerant vapor from evaporator 13. The condensed liquid enters throttling valve 12 through inlet 31 and proceeds to the evaporator 13 through inlet 32 where it is heated by heat exchange with hydronic fluid which serves to cool the load. The expanded and cool vapor then passes into heat exchanger 11 where it cools the hot liquid refrigerant vapor and then passes into absorber 15 through inlet 30.

The low-temperature cycle features an absorber 4 according to the configuration of this invention. Low-temperature absorber 4 consists of an upper low-temperature absorber compartment 712 and a lower low-temperature absorber compartment 714 joined by absorber tube 716. Absorber tube 716 comprises an inverted triangle 718 for metering weak solution into absorber tube 716 and inner concentric tube 744 from which extends a helically wound fin 746 which contacts the inner wall of tube 716.

Weak solution enters upper low-temperature absorber compartment 712 through inlet 112 where it accumulates in the bottom of compartment 712 and is metered into absorber tube 716 through inverted triangle opening 718. The weak solution flows downward coating the inside wall of tube 716 and fin 746. The vapor from low-temperature evaporator 2 enters lower absorber compartment 714 through inlet 106 and proceeds upward in the helical passage 715 formed by the inner wall of tube 716, the outer wall of tube 744 and the helical fin 746. As the vapor moves upward in passage 715, it is absorbed into the ever changing surfaces exposed by the interaction of flutes 720 and fin 746 as the weak solution proceeds downward under the force of gravity. Strong solution emerges into the lower absorber compartment 714 where it exits through outlet 740 and then enters pump 708 to be conveyed to desorber 6. To maintain a relatively constant velocity for the vapor as it is absorbed in its upward progression and absorption in passages 715 and to maintain liquid-vapor equilibrium conditions, it is desirable to use a helical fin 746 with increasing pitch in a downward direction.

The heat produced by the absorption process occurring in absorber 4 is removed by heat exchange to a hydronic fluid. Hydronic fluid enters lower hydronic compartment 732 through inlet 109 and passes through tube 738 into the intermediate hydronic compartment 734 where it surrounds absorption tube 716 and cools the absorption process taking place in tube 716. Absorber 4 may also be configured so that hydronic fluid in lower hydronic compartment 732 passes upward through the inside of tube 744 to remove absorption heat. The heated hydronic fluid passes into upper hydronic compartment 730 through tube 736 and merges with the flow from tube 744 if so configured. The heated hydronic fluid leaves compartment 730 through exit 742 and proceeds to radiator 8 through inlet 118. The heat may be used to heat living space during periods of low temperature or to heat a water supply during cooling periods. Any excess heat is transferred to outdoor ambient air.

The refrigerant vapor from the low-temperature desorption process passes into a low-temperature condenser 7 through inlet 115 where it is condensed. The liquid vapor is then passed to a precooler 3 where it is cooled by vapor from low-temperature evaporator 2. The condensed liquid then proceeds to inlet 101 of throttling valve 1 and then proceeds to the low-temperature evaporator 2 where it receives heat transferred through radiator 9 coming either from the load under cooling conditions or from ambient outdoor air using a hydronic fluid circuit.

The low-temperature condenser 7, the high and low-temperature evaporators 2 and 13, respectively. and the high and low-temperature heat exchangers 3 and 11 are of conventional construction. Preferably, low-temperature condenser 7 is of fluted tube-in-cylinder construction in which vapor circulates and condenses in the inner fluted tube while hydronic fluid circulates in cross-flow across the coils in the containing cylinder. Evaporators 2 and 13 are also of fluted tube-in-cylinder construction. The refrigerant circulates and evaporates in the inner twisted fluted tube while the hydronic fluid passes in cross flow across the coils in the containing cylinder. Heat exchangers 3 and 11 are typically of fluted tube-in-tube design in which the vapor from the evaporators flows through the inner fluted tube while the condensed liquid flows between the inner and outer tubes. The general connection of the various components of both the high and low-temperature cycles follows the description for FIGS. 2 and 3.

It is possible that changes in configurations to other than those shown could be used but that which is shown if preferred and typical. Without departing from the spirit of this invention, it is to be understood that various countercurrent and cocurrent liquid-vapor flow patterns may be used within and among the various components.

It is therefore understood that although the present invention has been specifically disclosed with the preferred embodiment and examples, modifications to the design concerning sizing, shape and flow will be apparent to those skilled in the art and such modifications and variations are considered to be equivalent to and within the scope of the disclosed invention and the appended claims.

We claim:
1. An absorption refrigeration machine comprising:
a) a first loop comprising a first generator, a first rectifier, a first condenser, a first evaporator, and a first absorber operatively connected together;
b) a second loop comprising a second generator, a second condenser, a second evaporator and a second absorber operatively connected together, wherein said first generator and said first rectifier have a higher operating temperature than said second generator; and wherein c) said first rectifier and said second generator are in heat exchange relation.

2. The machine according to claim 1 wherein said first rectifier and said second generator are in direct heat exchange relation.

3. The machine according to claim 1 wherein said first loop comprises a refrigerant pair selected from the group of refrigerant pairs consisting of 1) ammonia/water and 2) ammonia and water/lithium bromide.

4. The machine according to claim 1 wherein said second loop uses a refrigerant pair selected from the group of refrigerant pairs consisting of 1) ammonia/sodium thiocyanate and 2) ammonia/sodium thiocyanate and lithium thiocyanate, 3) methanol/lithium bromide and zinc bromide, 4) water/lithium bromide and zinc bromide, and 5) R-22/E-181 and R123a/ETFE.

5. The machine according to claim 1 wherein said first loop uses an ammonia/water refrigerant pair and said second loop uses an ammonia/sodium thiocyanate refrigerant pair.

6. The machine according to claim 1 wherein said first loop uses an ammonia/water refrigerant pair and said second loop uses an ammonia/water refrigerant pair.

7. The machine according to claim 1 wherein said second loop uses ammonia and at least one thiocyanate salt as a refrigerant pair.

8. The machine according to claim 1 wherein said second loop uses an ammonia/sodium thiocyanate and lithium thiocyanate refrigerant pair.

9. The absorption refrigeration machine of claim 1 wherein said first generator is heated with a combustible fuel producing flue gases.

10. The absorption refrigeration machine of claim 9 wherein said flue gases are used to heat a second loop strong solution after heating said first generator.

11. The invention according to claim 1 wherein said first condenser is in heat exchange relation with said second generator.

12. The invention according to claim 11 wherein said heat exchange relation of said first condenser with said second generator is a direct heat exchange relation.

13. The machine according to claim 1 wherein said first absorber is in heat exchange relation with said second generator.

14. The machine according to claim 13 wherein said heat exchange relation of said first absorber with said second generator is a direct heat exchange relation.

15. The machine according to claim 1 wherein said first condenser and said first absorber are in heat exchange relation with said second generator.

16. The machine according to claim 2 wherein said first condenser and said first absorber are in direct heat exchange relation with said second generator.

17. The machine according to claim 16 wherein flue gases from heating said first generator are used to heat a second loop strong solution.

18. The machine according to claim 1 wherein said second absorber is used to heat a water supply.

19. The machine according to claim 1 wherein said second condenser is used to heat a water supply.

20. The machine according to claim 1 wherein said first evaporator and said second evaporator are used to remove heat from a load.

21. The machine according to claim 1 wherein said first absorber, said second absorber and said second condenser are used to heat a load.

22. The machine according to claim 1 wherein said first evaporator is used to cool said second absorber.

23. The machine according to claim 1 wherein said first evaporator is used to cool said second condenser.

24. The machine according to claim 1 with said second generator comprising
  a. a generally vertical tube having an inner wall and an outer wall and an upper end and a lower end;
  b. a longitudinal member contained within said vertical tube so as to provide a continuous indirect passage between said upper end and said lower end of said tube;
  c. a groove formed in said inner wall of said vertical tube;
  d. said groove in said inner wall of said vertical tube, said inner wall of said vertical tube and said longitudinal member being in close enough proximity to cooperate with each other and with gravitational forces acting on a second loop strong solution
    1) to transport said strong solution from said upper end to said lower end of said vertical tube,
    2) to distribute said strong solution on said inner wall of said tube and a surface of said longitudinal member,
    3) to continually renew the surface of said strong solution and
    4) to maintain said indirect continuous passage from said upper end of said tube to said lower end of said tube to afford upward movement of a refrigerant vapor expelled from said strong solution to said upper end of said tube.

25. The machine according to claim 24 wherein said groove has a downward emptying bias.

26. The machine according to claim 24 wherein said groove is a helical flute.

27. The machine according to claim 26 wherein said helical flute has a downward emptying bias.

28. The machine according to claim 26 wherein said helical flute projects outward from said outer wall of said vertical tube as a helical tube wall crest.

29. The machine according to claim 28 wherein different portions of said helical tube wall crest have a different pitch.

30. The machine according to claim 28 wherein different portions of said helical tube wall crest have a varying pitch.

31. The machine according to claim 28 further comprising a fin projecting outward from said outer wall of said tube.

32. The machine according to claim 24 with said longitudinal member comprising a helical fin projecting from a shaft concentric with said vertical tube.

33. The machine according to claim 32 wherein said shaft is a tube.

34. The machine according to claim 32 wherein said helical fin contacts said inner wall of said vertical tube.

35. The machine according to claim 32 wherein said helical fin has a variable pitch.

36. The machine according to claim 35 wherein said helical fin has an increasing pitch from bottom to top.

37. The machine according to claim 24 further comprising a fin projecting outward from said outer wall of said vertical tube.

38. The machine according to claim 37 wherein said fin projecting outward from said outer wall is a helical fin.

39. The machine according to claim 24 wherein at least a portion of said outer wall of said of said vertical tube is confined within a chamber.

40. The machine according to claim 39 wherein said chamber has an inlet and an outlet.

41. The machine according to claim 40 wherein said strong solution in said vertical tube is heated by a hydronic fluid flowing through said chamber.

42. The machine according to claim 41 wherein said hydronic fluid is in heat exchange relation with said first rectifier.

43. The machine according to claim 41 wherein said hydronic fluid is in heat exchange relation with said first condenser.

44. The machine according to claim 41 wherein said hydronic fluid is in heat exchange relation with said first absorber.

45. The machine according to claim 41 wherein said hydronic fluid is in heat exchange relation with flue gas from heating of said first generator.

46. The machine according to claim 41 wherein said hydronic fluid is in heat exchange relation with said first condenser, said first absorber, said first rectifier, and hot flue gas from heating of said first generator.

47. The machine according to claim 41 with said longitudinal member comprising a helical fin projecting from a second tube that is concentric with said vertical tube, said helical fin and said strong solution thereon being heated by said hydronic fluid flowing through said second tube.

48. The machine according to claim 40 with at least a part of said chamber comprising a concentric cylinder about said vertical tube.

49. The machine according to claim 48 wherein said groove is a helical flute that projects outward from said outer wall of said vertical tube as a helical tube wall crest.

50. The machine according to claim 49 wherein said helical tube wall crest is in contact with said cylinder with said cylinder, said crest, and said vertical tube forming a helical passage.

51. The machine according to claim 50 wherein said helical tube wall crest has a variable pitch.

52. The machine according to claim 50 wherein refrigerant vapor enters helical said passage at the top of said helical passage and condensed liquid refrigerant leaves at the bottom of said helical passage.

53. The machine according to claim 50 wherein weak solution enters the top of said helical passage through an inlet at the top of said cylinder and vapor enters said helical passage at the bottom of said helical passage with resulting strong solution leaving at the bottom of said helical passage.

54. The machine according to claim 53 having at least one additional helical tube wall crest in contact with said cylinder to form at least two helical passages with weak solution entering tops of said helical passages through inlets at a top of said cylinder and vapor entering bottoms of said helical passages with resulting strong solution leaving said helical passages at said bottoms of said helical passages with said inlets to said helical passages at said top of said cylinder being inverted triangular passages with the downward apices of said inverted triangular passages being at the same level.

55. The machine according to claim 53 with said helical tube wall crest having increasing pitch in a downward direction.

56. The machine according to claim 50 wherein refrigerant vapor with some absorbent vapor enter said helical passage at the bottom of said helical passage with said refrigerant vapor leaving said helical passage at the top of said helical passage and said condensed absorbent vapor leaving at the bottom of said helical passage.

57. The machine according to claim 1 with said first generator comprising
   a. a generally vertical tube having an inner wall and an outer wall and an upper end and a lower end;
   b. a longitudinal member contained within said vertical tube so as to provide a continuous indirect passage between said upper end and said lower end of said vertical tube;
   c. a groove formed in said inner wall of said vertical tube;
   d. said groove in said inner wall of said vertical tube, said inner wall of said vertical tube and said longitudinal member being in close enough proximity to cooperate with each other and with gravitational forces acting on a first loop strong solution:
      1) to transport said strong solution from said upper end to said lower end of said vertical tube;
      2) to distribute said strong solution on said inner wall of said tube and a surface of said longitudinal member,
      3) to continually renew the surface of said strong solution and
      4) to maintain said indirect continuous passage from said upper end of said tube to said lower end of said tube to afford upward movement of a refrigerant vapor and some absorbent vapor expelled from said strong solution to said upper end of said tube.

58. The machine according to claim 57 wherein at least a portion of said outer wall of said vertical tube is confined within a chamber wherein said chamber has an inlet and an outlet and wherein said vertical tube is heated by hot flue gases passing through said chamber.

59. The machine according to claim 58 with said longitudinal member comprising a helical fin projecting from a second tube that is concentric with and positioned within said vertical tube, said helical fin and said strong solution thereon being heated by said flue gases passing through said second tube.

60. The machine according to claim 1 with said second absorber comprising
   a. a generally vertical tube having an inner wall and an outer wall and an upper end and a lower end;
   b. a longitudinal member contained within said vertical tube so as to provide a continuous indirect passage between said upper end and said lower end of said vertical tube;
   c. a groove formed in said inner wall of said vertical tube;
   d. said groove in said inner wall of said vertical tube, said inner wall of said vertical tube and said longitudinal member being in close enough proximity to cooperate with each other and with gravitational forces acting on a second loop weak solution
      1) to transport said weak solution from said upper end to said lower end of said vertical tube,
      2) to distribute said weak solution on said inner wall of said tube and said surface of said longitudinal member,
      3) to continually renew the surface of said weak solution, and
      4) to maintain said indirect continuous passage from said upper end of said tube to said lower end of said tube to afford upward movement and absorption of refrigerant vapor entering the bottom of said vertical tube.

61. The machine according to claim 60 wherein at least a portion of said outer wall of said tube is confined within a chamber wherein said chamber has an inlet and an outlet and wherein said vertical tube is cooled by a hydronic fluid passing through said chamber.

62. The machine according to claim 61 with said longitudinal member comprising a helical fin projecting from a second tube that is concentric with said vertical tube.

63. The machine according to claim 62 with said second tube, said helical fin and said weak solution thereon being cooled by said hydronic fluid flowing through said second tube.

64. The machine according to claim 62 wherein said pitch of said helical fin increases from top to bottom of said second tube.

65. A machine having at least two second absorbers according to claim 60 wherein said weak solution enters said vertical tube of each of said second absorbers through an inverted triangular passage in said upper end of said vertical tube with a lower apex of said inverted triangular passage of each of said second absorbers being at the same level.

66. A heat pump component comprising
   a. a generally vertical tube having an inner wall and an outer wall and an upper end and a lower end;
   b. a longitudinal member contained within said vertical tube so as to provide a continuous indirect passage between said upper end and said lower end of said tube;
   c. a groove formed in said inner wall of said vertical tube;
   d. said groove in said inner wall of said vertical tube, said inner wall of said vertical tube and said longitudinal member being in close enough proximity to cooperate with each other and with gravitational forces acting on a liquid
      1) to transport said liquid in a downward direction in said vertical tube,
      2) to distribute said liquid on said inner wall of said vertical tube and a surface of said longitudinal member,
      3) to continually renew the surface of said liquid, and
      4) to maintain said indirect continuous passage through said vertical tube.

67. The component according to claim 66 wherein said groove has a downward emptying bias.

68. The component according to claim 66 wherein said groove is a helical flute.

69. The component according to claim 68 wherein said helical flute has a downward emptying bias.

70. The component according to claim 68 wherein said helical flute projects through said vertical tube and extends outward from said outer wall of said vertical tube as a tube wall crest.

71. The component according to claim 66 further comprising a fin projecting outward from said outer wall of said tube.

72. The component according to claim 66 with said longitudinal member comprising a helical fin projecting from a shaft with a longitudinal axis that is coextensive with the longitudinal axis of said vertical tube.

73. The component according to claim 72 with said helical fin projecting outward from said shaft having a variable pitch.

74. The component according to claim 73 with said helical fin projecting outward from said shaft having decreasing pitch in a downward direction.

75. The component according to claim 73 with said helical fin projecting outward from said shaft having decreasing pitch in an upward direction.

76. The component according to claim 72 wherein said shaft is a second tube.

77. The component according to claim 76 wherein said second tube is an open ended tube.

78. The component according to claim 72 wherein said helical fin contacts said inner wall of said tube.

79. The component according to claim 66 further comprising a fin projecting outward from said outer wall of said vertical tube.

80. The component according to claim 79 wherein said fin projecting outward from said outer wall is a helical fin.

81. The component according to claim 66 wherein at least a portion of said outer wall of said tube is confined within a chamber.

82. The component according to claim 81 wherein said chamber has an inlet and an outlet.

83. The component according to claim 82 wherein said chamber contains packing material.

84. The component according to claim 83 wherein said packing material is Rashig rings.

85. The component according to claim 82 wherein said chamber comprises a concentric cylinder about said vertical tube.

86. The component according to claim 85 wherein said groove is a helical flute that projects through said vertical tube and extends outward from said outer wall of said vertical tube as a helical tube wall crest.

87. The component according to claim 86 with said helical tube wall crest having variable pitch.

88. The component according to claim 87 with said helical tube wall crest having increasing pitch in a downward direction.

89. The component according to claim 87 with said helical tube wall crest having increasing pitch in an upward direction.

90. The component according to claim 86 wherein said helical tube wall crest contacts said concentric cylinder to form a helical passage between said vertical tube outer wall of said inner wall of said concentric cylinder.

91. The component according to claim 90 further comprising at least one additional helical flute that projects through said vertical tube and extends outward from said outer wall of said vertical tube as a second tube wall crest that contacts said concentric cylinder to form at least one additional passage between said outer vertical tube wall and the inner wall of said concentric cylinder.

92. The component according to claim 91 having a liquid metering system comprising multiple inverted triangular passages formed in said vertical tube with each said inverted triangular passage leading to a separate passage formed by said tube wall crests, said outer vertical tube wall and said inner concentric cylinder wall with each of the apices of said inverted triangle being at the same level.

93. A liquid metering system for at least two of said heat pump components according to claim 66 wherein said upper end of each of said vertical tubes extends through the bottom of a liquid container with each of said vertical tubes having an inverted triangular passage with all of the lower apices of said inverted triangular passages being at the same level.

94. A heat pump liquid metering device comprising:
   a. two or more conduits;
   b. each of said conduits having an upper portion that extends upward through the bottom of a liquid container;
   c. each of said conduits having formed therein an inverted triangular opening with the downward directed apices of all of said inverted triangular openings being at the same level.

95. The heat pump liquid metering device according to claim 94 wherein said conduits are separate vertical tubes.

96. The heat pump liquid metering device according to claim 95 wherein said vertical tubes comprise a generator.

97. The heat pump liquid metering device according to claim 95 wherein said vertical tubes comprise an absorber.

98. The heat pump liquid metering device according to claim 94 wherein said conduits are separate passages formed by outward projecting crests of a tube having multiple crest starts, the outer wall of said tube, and the inner wall of a surrounding concentric cylinder wherein said projecting crests contact said inner wall of said surrounding concentric cylinder.

99. The heat pump liquid metering device according to claim 98 wherein said conduits comprise an absorber.

* * * * *